US012795373B2

(12) United States Patent
Muhanna et al.

(10) Patent No.: US 12,795,373 B2
(45) **Date of Patent: *Nov. 10, 2026**

(54) METHOD AND DEVICE FOR OBTAINING UE SECURITY CAPABILITIES

(71) Applicant: HUAWEI TECHNOLOGIES CO., LTD., Shenzhen (CN)

(72) Inventors: Ahmad Shawky Muhanna, Richardson, TX (US); He Li, Shanghai (CN); Mazin Ali Al-Shalash, Frisco, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

This patent is subject to a terminal disclaimer.

(21) Appl. No.: 18/759,815

(22) Filed: Jun. 29, 2024

(65) Prior Publication Data

US 2024/0357361 A1 Oct. 24, 2024

Related U.S. Application Data

(60) Continuation of application No. 17/683,022, filed on Feb. 28, 2022, now Pat. No. 12,047,781, which is a (Continued)

(51) Int. Cl.

*H04W 12/00* (2021.01)
*H04L 9/40* (2022.01)

(Continued)

(52) U.S. Cl.

CPC ........... *H04W 12/60* (2021.01); *H04L 63/205* (2013.01)

(58) Field of Classification Search

CPC . H04W 12/60; H04W 12/122; H04W 12/128; H04W 36/0038; H04W 12/00; H04L 63/205; H04L 29/06

See application file for complete search history.

(56) References Cited

U.S. PATENT DOCUMENTS 8,219,064 B2 7/2012 He
9,241,261 B2 1/2016 He (Continued)

FOREIGN PATENT DOCUMENTS

CN 101174943 A 5/2008
CN 101378591 A 3/2009

(Continued)

OTHER PUBLICATIONS

Ericsson: "New requirements for algorithm selection in TS 33.501", 3GPP Draft; S3-172406, 3rd Generation Partnership Project (3GPP) , Moblle Competence Centre; 650, Route Des Lucioles; F-06921 Sophia-Antipolls Cedex; France, vol. SA WG3, No. Singapore; Oct. 9, 2017-Oct. 13, 2017, Oct. 6, 2017 (Oct. 6, 2017) , XP051348279, total 2 pages.

(Continued)

*Primary Examiner* — Quazi Farooqui
(74) *Attorney, Agent, or Firm* — Slater Matsil, LLP

(57) ABSTRACT

A method and apparatus are provided for delivering user equipment (UE) new radio (NR) security capabilities and mobility management entity interworking. In the embodiments, adding the UE NR security capabilities in a new information element over a non-access stratum (NAS) is compatible with a legacy mobility management entity and eliminate any potential of bidding-down attack and is more advantageous and serves the security solution better. As long as the UE is connected to the long term evolution (LTE) and all UE security capabilities including LTE security capabilities have been replayed correctly and successfully in the NAS security mode command (SMC) message, the UE may not consider the absence of the UE NR security capabilities in the NAS SMC as a security vulnerability.

20 Claims, 14 Drawing Sheets

Related U.S. Application Data division of application No. 16/783,976, filed on Feb. 6, 2020, now Pat. No. 11,418,962, which is a continuation of application No. PCT/US2018/058145, filed on Oct. 30, 2018.

(60) Provisional application No. 62/579,012, filed on Oct. 30, 2017.

(51) Int. Cl.
*H04L 29/06* (2006.01)
*H04W 12/60* (2021.01)

(56) References Cited

U.S. PATENT DOCUMENTS

| | | | |
|---|---|---|---|
| 11,553,388 B2 | 1/2023 | Wu | |
| 2007/0153793 A1 | 7/2007 | Jiang | |
| 2008/0254833 A1 | 10/2008 | Keevill et al. | |
| 2009/0298471 A1 | 12/2009 | He | |
| 2012/0039464 A1 | 2/2012 | Xu et al. | |
| 2012/0315878 A1 | 12/2012 | Deng | |
| 2013/0051288 A1 | 2/2013 | Yamada et al. | |
| 2013/0236016 A1 | 9/2013 | Zhang et al. | |
| 2013/0269001 A1 | 10/2013 | Janakiraman et al. | |
| 2013/0343280 A1 | 12/2013 | Lee et al. | |
| 2014/0369315 A1 | 12/2014 | Norrman | |
| 2016/0014647 A1 | 1/2016 | Yi et al. | |
| 2016/0044002 A1 | 2/2016 | Ying et al. | |
| 2016/0219475 A1 | 7/2016 | Kim | |
| 2016/0255675 A1 | 9/2016 | Van Lieshout et al. | |
| 2017/0006469 A1* | 1/2017 | Palanigounder | H04L 9/0841 |
| 2017/0034866 A1 | 2/2017 | Wager et al. | |
| 2017/0311290 A1 | 10/2017 | Adjakple et al. | |
| 2018/0041901 A1 | 2/2018 | Yilmaz et al. | |
| 2018/0083972 A1 | 3/2018 | Kim | |
| 2018/0249479 A1 | 8/2018 | Cho et al. | |
| 2018/0302809 A1 | 10/2018 | Liubinskas et al. | |
| 2018/0376384 A1* | 12/2018 | Youn | H04W 36/144 |
| 2019/0246282 A1 | 8/2019 | Li et al. | |
| 2019/0289571 A1 | 9/2019 | Park et al. | |
| 2020/0008255 A1 | 1/2020 | Sharma et al. | |
| 2020/0037151 A1 | 1/2020 | Du et al. | |
| 2020/0322160 A1 | 10/2020 | Torvinen et al. | |

FOREIGN PATENT DOCUMENTS

| | | |
|---|---|---|
| CN | 101384079 A | 3/2009 |
| CN | 101552982 A | 10/2009 |
| CN | 102014520 A | 4/2011 |
| CN | 102487507 A | 6/2012 |
| CN | 103220674 A | 7/2013 |
| CN | 104247328 B | 6/2017 |
| CN | 106851856 A | 6/2017 |

OTHER PUBLICATIONS

Huawe et al: "ENDC5 support legacy MME: Delivery UE NR sec. cap. to MeNB in X2 and SI HO", 3GPP Draft; S3-173131 ENDC5-Support-Legacy-MME-Deliver-UE-NR-SEC-CAP-During-HO 3rd Generation Partnership Project (3GPP) , Moblle Competence Centre; 650, Route Deslucioles; F-06921 Sophia-Antipolis, vol. SA WG3, No. Reno, NV, USA; Nov. 27, 2017-Dec. 1, 2017, Nov. 20, 2017 (Nov. 20, 2017), XP051380392, total 4 pages.

Ioannis Broustis et al., Detecting and preventing machine-to-machine hijacking attacks in cellular networks. Bell Labs Technical Journal ( vol. 17, Issue: 1, Jun. 2012), 16 pages.

Chadi Khirallah et al., Performance Analysis and Energy Efficiency of Random Network Coding in LTE—Advanced. IEEE Transactions on Wireless Communications ( vol. 11, Issue: 12, Dec. 2012), 11 pages.

3GPP TS 33.401 V15.1.0 (Sep. 2017), 3rd Generation Partnership Project; Technical Specification Group Services and System Aspects; 3GPP System Architecture Evolution (SAE); Security architecture(Release 15), 161 pages.

3GPP TSG SA WG3 (Security) Meeting #88, S3-171836, "pCR to 33.501: NAS security mode command procedure", Huawei; Hisilicon, Aug. 7-11, 2017, total 3 pages.

3GPP TSG SA WG3 (Security) Meeting #89, S3-173133, "EDCE5: UE NR Security Capabilities Bidding-down", Huawei, Hisilicon, Nov. 27-Dec. 1, 2017, total 3 pages.

3GPP TSG SA WG3 (Security) Meeting #88, S3-172033, revision of S3-17xabc, "NAS SMC Procedure", NEC, et al., Aug. 7-11, 2017, total 2 pages.

3GPP TSG SA WG3 (Security) Meeting #88Bis, S3-172372, "Discussion of possible methods and proposed solution for negotiating the algorithms for use between a UE and SgNB in EDCE5", Qualcomm Incorporated, Oct. 9-13, 2017, total 3 pages.

3GPP TR 33.899 V1.3.0 (Aug. 2017), 3rd Generation Partnership Project; Technical Specification Group Services and System Aspects; Study on the security aspects of the next generation system(Release 14), total 604 pages.

3GPP TS 23.401 , V15.0.0, "3rd Generation Parlnership Project; Technical Specification Group Services and System Aspects; General Packet Radio Service(GPRS) enhancements for Evolved Universal Terrestrial Radio Access Network; (E-UTRAN) access; (Release 15)", Jun. 2017, total 386 pages.

3GPP TS 23.401 V15.1.0 (Sep. 2017),3rd Generation Partnership Project; Technical Specification Group Services and System Aspects;General Packet Radio Service (GPRS) enhancements for Evolved Universal Terrestrial Radio Access Network (E-UTRAN) access(Release 15), 397 pages.

3GPP TS 23.501 V1.2.0; 3rd Generation Partnership Project; Technical Specification Group Services and System Aspects; System Architecture for the 5G System; Stage 2 (Release 15); Jul. 2017, 166 pages.

3GPP TS 24.301 , V15.0.0, "3rd Generation Partnership Project; Technical Specification Group Core Nelwork and Terminals; Non-Access-Stratum (NAS) protocol for Evolved Packet System (EPS): Stage 3, (Release 15)" , Sep. 2017, total 496 pages.

3GPP TS 33.102 V13.0.0; 3rd Generation Partnership Project; Technical Specification Group Services and System Aspects; 3G Security; Security architecture (Release 13), Jan. 2016, 76 pages.

3GPP TS 33.401 V13.0.0; 3rd Generation Partnership Project; Technical Specification Group Services and System Aspects; 3GPP System Architecture Evolution (SAE); Security architecture (Release 13); Sep. 2015, 131 pages.

3GPP TS 33.401 , V15.0.0, "3rd Generation Partnership Project; Technical Specification Group Services and System Aspects; 3GPP System Architecture Evolution (SAE);Security architecture (Release 15)", Jun. 2017, total 153 pages.

3GPP TS 33.501 V0.3.0; 3rd Generation Partnership Project; Technical Specification Group Services and System Aspects; Security Architecture and Procedures for 5G System (Release 15), Aug. 2017, 44 pages.

3GPP TS 36.413, V15.0.0, "3rd Generation Partnership Project; Technical Specification Group Radio Access Network; Evolved Universal Terrestrial Radio Access Network (E-UTRAN); S1 Application Protocol (S1AP); (Release 15)", Dec. 2017, total 367 pages.

Kafle, V.P., et al., "ID-based communication for realizing IoT and M2M in future heterogeneous mobile networks", International Conference on Recent Advances in Internet of Things (RIoT), Singapore, 205, Apr. 7-9, 2015, pp. 1-6, doi:10.1109/RIOT.2015.7104908.

Bikos, Anastasiosn and Nicolas Skavos."LTE/SAE security issues on 4G wireless network", Standards, IEEE Security andPivacy Manazine, Coupublished by the IEEE Computer and Reliablity Societies, Mar./ Apr. 2013, total 8 pages.

3GPP TSG SA WG2 Meeting #122 S2-174369, "TS 23.502 P-CR concerning use of Establishment Cause in Service Request procedures", Vencore Labs et al., Jun. 26-30, 2017, total 6 pages.

3GPP TSG SA WG2 Meeting #122bis S2-176118 (was S2-174472), "TS 23.502: Procedures for CM-Connected with RRC inactive state", Qualcomm Incorporated, Aug. 21-25, 2017, total 8 pages.

(56) References Cited

OTHER PUBLICATIONS

3GPP TSG SA WG3 (Security) Meeting #88Bis, S3-172277, "As Security Negotiation and Activation",Huawei et al, 9 Oct. 13, 2017, total 6 pages.
3GPP TSG SA WG3 (Security) Meeting #89, S3-172x01, ,(revision of S3-17xabc), "ENDC5: Delivery of UE NR security capabilities to MeNB",Huawei et al, Nov. 27-Dec. 1, 2017, total 7 pages.
3GPP TSG-SA WG3 Meeting #89, S3-172x02, "Protecting UE NR security capabilities", Huawei et al, Nov. 27 Dec. 1, 2017, total 6 pages.
3GPP TSG SA WG3 (Security) Meeting #88Bis, S3-17xx09, (revision of S3-17xabc) "AS UP Security Algorithms Negotiation", Huawei et al, 9 Oct. 13, 2017, total 8 pages.
3GPP TSG SA WG3 (Security) Meeting #90, S3-180426, (revision of S3-180100, S3-180270, and S3-180285) "AS Security Negotiation and Activation", Huawei et al, Jan. 22-26, 2018, total 3 pages.
3GPP TSG SA WG2 Meeting #122 S2-174369, 5GS_Ph1/Rel-15 "TS 23.502 P-CR concerning use of Establishment Cause in Service Request procedures", Vencore Labs et al., Jun. 26-30, 2017, total 6 pages.
3GPP TSG SA WG2 Meeting #122bis S2-176118, 5GS_Ph1/Rel-15, "TS 23.502: Procedures for CM-Connected with RRC inactive state", Qualcomm Incorporated,Aug. 21-25, 2017, total 8 pages.
3GPP TS 23.401, V14.1.0, "3rd Generation Partnership Project; Technical Specification Group Services and System Aspects; General Packet Radip Services (GPRS) enhancements for Evolved Universal Terrestrial Radio Access Network (E-UTRAN) access, (Release 14)", Sep. 2016, total 379 pages.

* cited by examiner

METHOD AND DEVICE FOR OBTAINING UE SECURITY CAPABILITIES

PRIORITY CLAIM AND CROSS-REFERENCE

This application is a Divisional of U.S. application Ser. No. 17/683,022, filed on Feb. 28, 2022 and now granted with U.S. Pat. No. 12,047,781, which is a Divisional of U.S. application Ser. No. 16/783,976, filed on Feb. 6, 2020 and now granted with U.S. Pat. No. 11,418,962, which is a continuation of PCT Application No. PCT/US2018/058145, filed on Oct. 30, 2018 and entitled "Method and Device for Obtaining UE Security Capabilities," which claims priority to U.S. Provisional Application No. 62/579,012 filed on Oct. 30, 2017, and entitled "Method and Device for Obtaining UE Security Capabilities". All of the aforementioned patent applications are incorporated herein by reference in their entirety.

TECHNICAL FIELD

The present disclosure relates to wireless communications technologies, in particular, to a method and device for obtaining user equipment (UE) security capabilities.

BACKGROUND

With the development of communications technologies and due to the variety of services, the service traffic of users become higher and the requirement of network speed is more strictly. To provide a better user experience, operators are keeping improving the abilities and functions of network devices and network solutions. A long term evolution (LTE) network has led to the development of the next generation radio network, also known as fifth generation (5G) network. However, the network operators may not change which technology they work in all at once. Therefore, the network equipment supporting different radio access technologies (RATs) may coexist in the same network.

SUMMARY

In one aspect, a method for obtaining UE new radio access technology (NR) security capabilities is provided. In the method, a target base station of an X2 handover sends an indication to source base station, the indication indicates a UE to send the UE NR security capabilities. The source base station sends the indication to the UE in a radio resource control connection reconfiguration message. The UE sends the UE NR security capabilities. For purpose of clarity, NR also may refer to "new radio" or "next generation radio."

In another aspect, a method for obtaining UE next generation radio (NR) security capabilities is provided. In this method, in an X2 handover from a legacy evolved Node B (eNB) to a master evolved Node B (MeNB), the MeNB sends path switch request message to an enhanced mobility management entity (MME) to request the UE NR security capabilities. The enhanced MME sends the UE NR security capabilities to the MeNB in the path switch acknowledge message.

In one other aspect, a method for obtaining UE NR security capabilities is provided. In this method, a UE may trigger a tracking area update (TAU) to send the UE NR security capabilities to a MeNB. The UE may receive an indication in an X2 handover or in S1 handover, the indication indicates that a TAU is required to send the UE NR security capabilities. The X2 and S1 are interfaces between network infrastructure devices.

In one other aspect, a method for obtaining security capabilities in a handover is provided. In the method, a target base station receives a handover request message from a source base station, and sends a handover request acknowledge message to the source base station, the handover request acknowledge message includes an indication indicating a user equipment (UE) to send UE next generation radio (NR) security capabilities. The target base station receives the UE NR security capabilities from the UE.

In an implementation, the target base station receives the UE NR radio capabilities in the handover request message. The UE NR security capabilities from the UE may be included in a radio resource control connection reconfiguration complete message.

Optionally, the UE NR security capabilities from the UE is included in a handover confirm message.

In another implementation according to the above aspect and implementation, the target base station sends a secondary next generation Node B (SgNB) addition request message to a SgNB, wherein the secondary addition request message includes the UE NR security capabilities.

In one aspect, a method for obtaining security capabilities is provided. In the method, a UE receives an indication in a handover, wherein the indication indicating to send UE next generation radio (NR) security capabilities in a tracking area update procedure. The UE sends a tracking area update request message to a target base station of the handover, wherein the tracking area update request message comprising the UE NR security capabilities.

In an implementation, the indication is received in a handover command message in an S1 handover. Alternatively, the indication is received in a radio resource control connection reconfiguration message in an X2 handover.

In one aspect of the present disclosure, a base station is provided. The base station comprises a receiver configured to receive a handover request message from a source base station; and a transmitter configured to send a handover request acknowledge message to the source base station, the handover request acknowledge message includes an indication indicating a use equipment (UE) to send UE next generation radio (NR) security capabilities. The receiver is further configured to receive the UE NR security capabilities from the UE.

In an implementation, the UE NR security capabilities from the UE is included in a radio resource control connection reconfiguration complete message.

In another implementation, the transmitter is further configured to send a secondary next generation Node B (SgNB) addition request message to a SgNB, wherein the secondary addition request message includes the UE NR security capabilities.

In an aspect, a method is provided. In the method, a MME receives an attach request message sent from a UE, wherein the attach request message comprising UE security capabilities including UE next generation radio (NR) security capabilities. The MME recovers the UE security capabilities except the UE NR security capabilities, and sends a non-access stratum (NAS) security mode command message comprising the UE security capabilities except the UE NR security capabilities. The UE receives the NAS security mode command message and while UE is attached to LTE network, and accepts the UE security capabilities. The UE continues the attach procedure.

In an aspect, a base station is provided. The base station comprises a receiver for receiving a handover request message from a source base station, and a transmitter for transmitting a handover request acknowledge message to the source base station, the handover request acknowledge message includes an indication indicating a user equipment (UE) to send UE next generation radio (NR) security capabilities, wherein the base station further receives UE NR security capabilities from the UE.

In an implementation, the base station receives the UE NR radio capabilities in the handover request message. Optionally, the UE NR security capabilities from the UE is included in a radio resource control connection reconfiguration complete message. Alternatively, the UE NR security capabilities from the UE is included in a handover confirm message.

In the aspects or implementations, during an X2 handover from an eNB to MeNB, if the MeNB receives the UE ENDC radio support capability, whether the UE is authorized for ENDC service as per the Restrictions list, but it does not receive the UE NR security capabilities and the UE NR radio capabilities, the MeNB may not add SgNB until X2 handover is complete. Having the UE to send its NR security capabilities in the RRC connection reconfiguration complete message to the target MeNB sounds straightforward. In order to avoid the UE sending its NR security capabilities during every X2 handover, the MeNB includes a flag to the UE to send its UE NR security capabilities. At the same time the MeNB does not receive the UE NR security capabilities nor the UE NR Radio capabilities, the MeNB shall include a flag to the UE to send its UE NR security capabilities in the RRC Connection reconfiguration Complete message. When the UE receives this flag, the UE includes its NR security capabilities in the RRC Connection reconfiguration complete sent to the target MeNB. After the target MeNB receives the UE NR security capabilities, it enquire the UE for its NR Radio capabilities and starts adding the SgNB. Therefore, it works with legacy MME without the requirement of any change to legacy MME. The handover procedure is changed limited and only impacts UE that support ENDC. It is applicable to the X2 handover, S1 handover, or the initial attachment.

In an aspect, a communications method is provided. In the method, a UE transmits an attach request message or a tracking area update request message to a mobility management entity, the attach request message or the TAU request message includes UE security capabilities comprising UE new radio (NR) security capabilities. If the mobility management entity does not understand the UE NR security capabilities, the mobility management entity may replay UE security capabilities without the UE NR security capabilities to the UE in a non-access stratum (NAS) security mode command (SMC) message. Optionally, the mobility management entity may drop the UE NR security capabilities and does not save the UE NR security capabilities in the UE context. When the UE receives the NAS SMC message and the UE NR security capabilities are not included in the replayed UE security capabilities, the UE may determine that it is not a security vulnerability, i.e., the UE may determine that no bidding down attack has happened even if there is a mismatch UE security capabilities comprised in the attach request message (or TAU request message) and the replayed UE security capabilities. Then, the UE may continue the attach procedure or the TAU procedure. Thus, the UE may attaching to the mobility management entity. According to the embodiment of the present disclosure, it is guaranteed that the legacy LTE network may exist with an enhanced LTE network or the NR network by without changing the legacy network elements. Meanwhile, the security requirements of the communication also can be guaranteed.

Optionally, if the mobility management entity understand the UE NR security capabilities, the mobility management entity may send the UE NR security capabilities to an eNB, in the S1 initial context setup message. The eNB is a base station to which the UE sends the attach request message or the TAU request message.

In an implementation, the UE may send the UE NR security capabilities in a new IE over NAS, e.g., in attach request message or the TAU request message. Namely, the UE NR security capabilities may be indicated to the network using a new IE so that the support of UMTS/EPS and NR algorithms can evolve independently. Thus, for example, the UE may send the UE NR security capabilities on a first IE and send the UMTS/LTE security capabilities on a second IE which is different from the first IE. Including the UE NR security capabilities in a new IE defeats bidding-down attack naturally. No extra requirements or features is required on legacy MME to defeat bidding down attack. No impact on S10 interface. It is possible that generating the same condition at a MeNB in an initial attach, X2 handover, or S1 handover which generates a single condition for MeNB to make a decision.

In an aspect, a communications method is provided. In the method, a MeNB establishes a RRC connection with a UE and the MeNB obtains UE NR security capabilities of the UE. The MeNB determines that the UE supports the NR capability. The MeNB may establish one or more DRBs for the UE at a SgNB. The MeNB may send the UE NR security capabilities associated with the UE in the SgNB addition procedure, and the MeNB receives a SgNB addition request acknowledge message from the SgNB. The SgNB may allocate resources and chooses the ciphering and integrity algorithms, and includes the chosen algorithms in the SgNB addition request acknowledge message. Thus, the UE can get faster transmission rate, the operator can provide better user experience to users after the UE attaches the network, X2 handover, or the S1 handover.

In an aspect, a user equipment is provided. The user equipment comprises a sending unit configured to transmit an attach request message or a TAU request message to a mobility management entity, wherein the attach request message includes UE security capabilities comprising UE NR security capabilities. The user equipment further comprises a receiving unit configured to receive a NAS SMC message from the mobility management entity, the NAS SMC message includes replayed UE security capabilities without including the UE NR security capabilities. The user equipment further comprises a processing unit configured to determine no bidding down attack has happened based on a mismatch of the UE security capabilities comprised in the attach request message or TAU request message and the replayed UE security capabilities, and attach to the mobility management entity.

In an aspect, a base station is provided. The base station comprises a processing unit configured to establish a RRC connection with a user equipment and determines that the UE supports an NR capability. The base station also comprises a receiving unit configured to obtain UE NR security capabilities of the UE. The base station further comprises a sending unit configured to transmit a SgNB addition request message to a SgNB, the SgNB addition request message comprises the UE NR security capabilities. The receiving unit is further configured to receive a SgNB addition request acknowledge message from the SgNB.

In an aspect, a mobility management entity is provided. The mobility management entity comprises a unit for receiving an attach request message or a TAU request message from a user equipment, the attach request message or the TAU request comprises UE security capabilities including UE new radio (NR) security capabilities. The mobility management entity further comprises a unit for replaying UE security capabilities included in the attach request message or the TAU request message to the UE, the replayed UE security capabilities being without comprising the UE NR security capabilities.

In an aspect, a mobility management entity is provided. The mobility management entity comprises a unit for receiving an attach request message or a TAU request message from a user equipment, wherein the attach request message comprises UE security capabilities that includes UE new radio (NR) security capabilities. The mobility management entity further comprises a unit for sending the UE NR security capabilities to a master evolved (eNB) in a S1 context setup message.

In an aspect, a base station is provided. The base station comprises a sending unit configured to send a path switch request message to an enhanced mobility management entity, wherein the path switch request message comprises an indication to request user equipment (UE) new radio (NR) security capabilities. The base station further comprises receiving unit configured to a path switch request acknowledge message from the enhanced mobility management entity, wherein the path switch request acknowledge message comprises the UE NR security capabilities.

In an aspect, a network device is provided. The network device comprises a non-transitory memory storing instructions; and one or more processors in communication with the non-transitory memory, wherein the one or more processors execute the instructions to perform the method according to the ninth aspect and corresponding possible implementations.

In an aspect, a non-transitory computer-readable media is provided. The non-transitory computer-readable media is configured to store computer instructions that when executed by one or more processors, cause the one or more processors to perform to the methods according to the first aspect, ninth aspect and above possible implementations.

In an aspect, a chipset system is provided. The chipset system includes at least one processor, used to implement the functionality of the above central device, the distributed device, or the RAN node. The chipset system may further includes a memory for storing program instructions and data. The chipset system may be comprised by chipsets, and may also be comprised by at least one of chipsets and other discrete device.

According to a second aspect, a method for attaching is provided. The method comprising: transmitting, by a UE, an attach request message to a mobility management entity, wherein the attach request message includes UE security capabilities comprising UE NR security capabilities; receiving, by the UE, a NAS SMC message from the mobility management entity, wherein the NAS SMC message includes replayed UE security capabilities without including the UE NR security capabilities; determining, by the UE, no bidding down attack has happened based on a mismatch of the UE security capabilities comprised in the attach request message and the replayed UE security capabilities; and attaching, by the UE, to the mobility management entity.

In a first implementation form of the method according to the second aspect as such, wherein the UE security capabilities comprise the UE NR security capabilities and UE LTE security capabilities, and the attach request message comprises a first information element for carrying the UE NR security capabilities and a second information element for carrying the UE LTE security capabilities.

In a second implementation form of the method according to the second aspect as such or any preceding implementation form of the second aspect, wherein the UE security capabilities further comprises UE UMTS security capabilities, the second information element further comprises the UE UMTS security capabilities.

According to a third aspect, a method of a dual connectivity is provided. The method comprising: establishing, by a MeNB, a RRC connection with a UE; determining, by the MeNB, that the UE supports a NR capability; obtaining, by the MeNB, UE NR security capabilities; transmitting, by the MeNB, a SgNB addition request message to a base station, wherein the SgNB addition request message comprises the UE NR security capabilities; and receiving, by the MeNB, a SgNB addition request acknowledge message from the base station.

In a first implementation form of the method according to the third aspect as such, wherein the SgNB addition request acknowledge message comprises NR algorithms selected by the base station.

In a second implementation form of the method according to the third aspect as such or any preceding implementation form of the third aspect, further comprising: sending, by the MeNB, a RRC connection reconfiguration message to the UE to instruct the UE to configure a DRB.

According to a fourth aspect, a communications method is provided. The method comprising: receiving, by a legacy mobility management entity, an attach request message from a user equipment, wherein the attach request message comprises UE security capabilities including UE NR security capabilities; and replaying, by the legacy MME, UE security capabilities included in the attach request message to the UE, the replayed UE security capabilities being without comprising the UE NR security capabilities.

In a first implementation form of the method according to the fourth aspect as such, further comprising: dropping, by the legacy MME, the UE NR security capabilities.

In a second implementation form of the method according to the fourth aspect as such or any preceding implementation form of the fourth aspect, wherein the UE security capabilities comprise the UE NR security capabilities and UE LTE security capabilities, and the attach request message comprises a first information element for carrying the UE NR security capabilities and a second information element for carrying the UE LTE security capabilities.

In a third implementation form of the method according to the fourth aspect as such or any preceding implementation form of the fourth aspect, wherein the UE security capabilities further comprises UE UMTS security capabilities, the second information element further comprises the UE UMTS security capabilities.

According to a fifth aspect, a communications method is provided. The method comprising: receiving, by an enhanced mobility management entity, an attach request message from a user equipment, wherein the attach request message comprises UE security capabilities that includes UE NR security capabilities; and sending, by the enhanced mobility management entity, the UE NR security capabilities to a MeNB in a S1 context setup message.

In a first implementation form of the method according to the fifth aspect as such, wherein the UE security capabilities comprise the UE NR security capabilities and UE long term evolution (LTE) security capabilities, and the attach request message comprises a first information element for carrying the UE NR security capabilities and a second information element for carrying the UE LTE security capabilities.

In a second implementation form of the method according to the fifth aspect as such or any preceding implementation form of the fifth aspect, wherein the UE security capabilities further comprises UE UMTS security capabilities, the second information element further comprises the UE UMTS security capabilities.

According to a sixth aspect, a communications method is provided. The method comprising: sending, by a base station, a path switch request message to an enhanced mobility management entity, wherein the path switch request message comprises an indication to request UE NR security capabilities; and receiving, by the base station, a path switch request acknowledge message from the enhanced mobility management entity, wherein the path switch request acknowledge message comprises the UE NR security capabilities.

In a first implementation form of the method according to the sixth aspect as such, further comprising: establishing, by the base station, a DRB at a second base station by sending the UE NR security capabilities in a SgNB addition procedure.

According to a seventh aspect, a method for attaching is provided. The method comprising: transmitting, by a UE, a TAU request message to a mobility management entity, wherein the TAU request message includes UE security capabilities comprising UE NR security capabilities; receiving, by the UE, a NAS SMC message from the mobility management entity, wherein the NAS SMC message includes replayed UE security capabilities without including the UE NR security capabilities; determining, by the UE, no bidding down attack has happened based on a mismatch of the UE security capabilities comprised in the TAU request message and the replayed UE security capabilities; and attaching, by the UE, to the mobility management entity.

In a first implementation form of the method according to the seventh aspect as such, wherein the UE security capabilities comprise the UE NR security capabilities and UE LTE security capabilities, and the TAU request message comprises a first information element for carrying the UE NR security capabilities and a second information element for carrying the UE LTE security capabilities.

In a second implementation form of the method according to the seventh aspect as such or any preceding implementation form of the seventh aspect, wherein the UE security capabilities further comprises UE UMTS security capabilities, the second information element further comprises the UE UMTS security capabilities.

According to an eighth aspect, a communications method is provided. The method comprising: receiving, by a legacy mobility management entity, a TAU request message from a user equipment, wherein the TAU request message comprises UE security capabilities including UE NR security capabilities; and replaying, by the legacy MME, UE security capabilities included in the TAU request message to the UE, the replayed UE security capabilities being without comprising the UE NR security capabilities.

In a first implementation form of the method according to the eighth aspect as such, further comprising: dropping, by the legacy MME, the UE NR security capabilities.

In a second implementation form of the method according to the eighth aspect as such or any preceding implementation form of the eighth aspect, wherein the UE security capabilities comprise the UE NR security capabilities and UE LTE security capabilities, and the TAU request message comprises a first information element for carrying the UE NR security capabilities and a second information element for carrying the UE LTE security capabilities.

In a third implementation form of the method according to the eighth aspect as such or any preceding implementation form of the eighth aspect, wherein the UE security capabilities further comprises UE universal mobile telecommunications system (UMTS) security capabilities, the second information element further comprises the UE UMTS security capabilities.

According to a ninth aspect, a communications method is provided. The method comprising: receiving, by an enhanced mobility management entity, an a TAU request message from a user equipment, wherein the TAU request message comprises UE security capabilities that includes UE NR security capabilities; and sending, by the enhanced mobility management entity, the UE NR security capabilities to a eNB in a S1 context setup message.

In a first implementation form of the method according to the ninth aspect as such, wherein the UE security capabilities comprise the UE NR security capabilities and UE LTE security capabilities, and the TAU request message comprises a first information element for carrying the UE NR security capabilities and a second information element for carrying the UE LTE security capabilities.

In a second implementation form of the method according to the ninth aspect as such or any preceding implementation form of the ninth aspect, wherein the UE security capabilities further comprises UE UMTS security capabilities, the second information element further comprises the UE UMTS security capabilities.

According to a tenth aspect, a network device is provided. The network device comprising: a non-transitory memory storing instructions; and one or more processors in communication with the non-transitory memory, wherein the one or more processors execute the instructions to perform the method according to any one of the second to ninth aspects.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
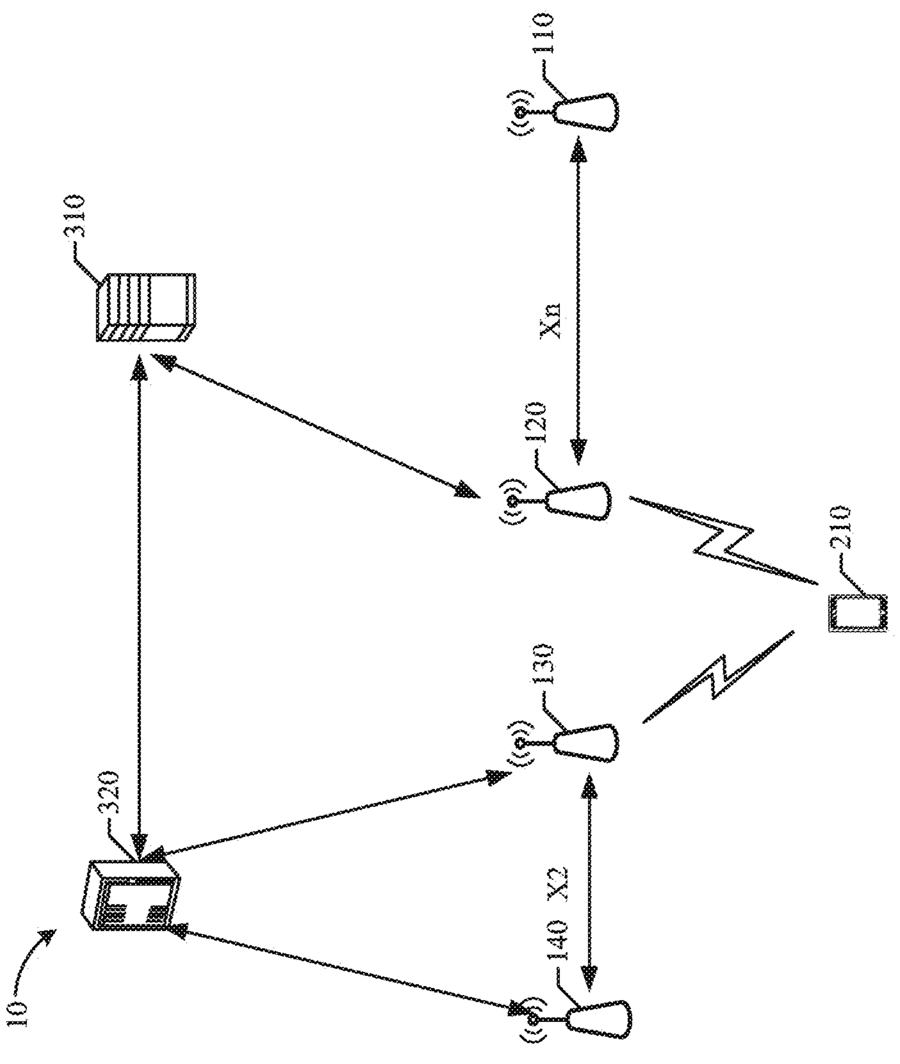
FIG. 1 illustrates simplified diagram of a network in an embodiment of the present disclosure.

The structure, manufacture and use of the presently embodiments are discussed in detail below. The specific embodiments discussed are merely illustrative of specific ways to make and use the disclosure, and do not limit the scope of the disclosure.

With the development of telecommunications technologies, LTE network has been deployed widely, and a next generation radio network, or a new radio (NR) network, as a more advanced radio technology, is also emerged. Therefore, the LTE network and the NR network may coexist. To have a smooth evolution from the LTE network to the NR network, some LTE base stations, i.e., eNBs, may have some functions of the NR network, for example, the LTE base stations may support UE NR security capabilities, interworking with a base station of the NR network, or E-UTRA next generation radio dual connectivity (ENDC) with a base station of the NR network. This kind of eNB in the LTE network may be called enhanced eNB. Therefore, there may have two kinds of eNBs in the LTE network, one is a legacy eNB, which cannot support the function of the NR network, such as the UE NR security capabilities. The legacy eNB also cannot support interworking with the NR network or support the dual connectivity with the base station of the NR network. Another is the enhanced eNB.

The legacy eNB may be connected to a legacy MME. The legacy MME does not support some of the functions, include security functions, of the NR network. For example, the legacy MME may not recognize the UE NR security capabilities, and may not support attach message hashing. The legacy MME also does not support dual connectivity with the base station of the NR network.

The enhanced eNB supports functionality that the legacy MME does not. The enhanced eNB may be connected to an enhanced MME (eMME), which is an MME of the LTE network. The enhanced eNB can support the security features of the NR network. The eMME may support the UE NR security capabilities, and also can support the dual connectivity with the NR network.

In embodiments of the present disclosure, the ENDC functionality, which is also referred to as an ENDC feature or ENDC function, allows an enhanced eNB to request a base station of the NR network to provide radio resources for a UE while keeping responsibility for that UE. The UE is connected to the enhanced eNB that acts as a master node, i.e., master eNB (MeNB) and the base station of the NR network that acts as a secondary node. In a dual connectivity, the UE firstly accesses the master node. The master node triggers a procedure to add another node as the secondary node. The secondary node provides additional radio resources for the UE but is not the master eNB. The enhanced eNB is connected to an evolved packet core (EPC) network and the base station of the NR network is connected to the enhanced eNB via an Xn interface.

In embodiments of the present disclosure, the UE security capabilities includes a list of security protection algorithms that the UE supports. The UE NR security capabilities include encryption and/or integrity protection algorithms that the UE supports over the NR network.

FIG. 1 is a diagram of a network 10 of an embodiment of the present disclosure. The network 10 may comprises a next generation NB (gNB) 110, i.e., a base station of the NR network or 5G network, the base station is also known as transmission reception point (TRP). The network 10 may also comprise an enhanced eNB 120, and an enhanced MME (eMME) 310 to which the enhanced eNB 120 connected. The network 10 may further comprise at least one legacy eNB, for example, legacy eNB 130 and legacy eNB 140. There may be a X2 interface between the legacy eNB 130 and the legacy eNB 140. Both of the legacy eNB 130 and the legacy eNB 140 may connect to at least one legacy MME, for example, a legacy MME 320 in FIG. 1. In the embodiments of the present disclosure, an eNB that is connected to a legacy MME and an enhanced eNB that is connected to an enhanced MME may be located in different tracking areas (TAs). For example, the legacy eNB 130 and the legacy eNB 140 are located in TA1, and the enhanced eNB is located in TA2.

In embodiments of the present disclosure, at least one terminal may access to the network 10. As used herein, the term "terminal" refers to any component (or collection of components) capable of establishing a wireless connection with a base station, such as a user equipment (UE), a mobile station (STA), and other wirelessly enabled devices. In some embodiments. As illustrated in FIG. 1, a UE 210 may access to the legacy eNB 130 over a LTE air interface. Alternatively, the UE 210 may also access to the enhanced eNB 120.

In the embodiments of the present disclosure, the UE 210 may support the ENDC functionality and the UE NR security capabilities. The UE 210 also can support security capabilities in other RATs, for example, UE second generation (2G) or GSM EDGE Radio Access Network (GERAN) security capabilities, UE third generation (3G) or universal mobile telecommunications system (UMTS) security capabilities, and UE fourth generation (4G) or LTE security capabilities. Therefore, the UE 210 can establish a dual connectivity with the enhanced eNB 120 and the gNB 110, the enhanced eNB 120 in the ENDC is a master node, i.e., a master eNB (MeNB), and the gNB 110 in the ENDC is a secondary node, i.e., the secondary gNB (SgNB). Therefore, as shown in FIG. 1, the enhanced eNB 120 also is marked as MeNB 120, the gNB is also marked as SgNB 110.

In embodiments of the present disclosure, the term "network" maybe interchangeable with a term "system".

Optionally, in embodiments of the present disclosure, the UE NR radio capability may be included as a part of the UE radio capability information element (IE). This allows a legacy eNB to save the UE NR radio capability without the need to support or understand it. It also allows a legacy MME to store the UE NR security capabilities as part of the UE radio capability IE. The advantage of this way of coding the UE NR radio capability is that during an X2 or S1 handover, a target enhanced eNB in a handover may receive the UE radio capability either from the source legacy eNB or through the legacy eMME. Moreover, since the MeNB supports the UE NR radio capability, the MeNB may understand that the UE supports the NR radio and use that in making its decision during an X2 handover or a S1 handover. In some examples, the X2 handover refers to that the UE hands over from a source eNB to a target eNB utilizing the X2 interface control and user plane. The S1 handover refers to that the UE hands over from a source eNB to a target eNB utilizing the MME and the S1 interface control and user plane.

Optionally, in embodiments of the present disclosure, the UE NR security capabilities may not be a part of the UE radio or network capabilities IE. When UE communicate its NR security capabilities, the UE NR security capabilities may be an IE other than the UE network capability IE. This may cause any legacy MME to drop the UE NR security capabilities IE and the UE NR security capabilities do not get to be saved inside the UE context. In this way, when the legacy MME sends the UE context during a S1 handover, the eMME cannot receive the UE NR security capabilities from a legacy MME. This also means that if the MeNB receives the UE NR radio capability and does not receive the UE NR security capabilities during an X2 or S1 handover from the source legacy eNB or the legacy MME. It may be considered as an indication to the MeNB to not add the SgNB during the X2 or S1 handover.

In an embodiment of the present disclosure, as illustrated in FIG. 1, the UE 210 may attach to the legacy eNB 130.

Figure 2:
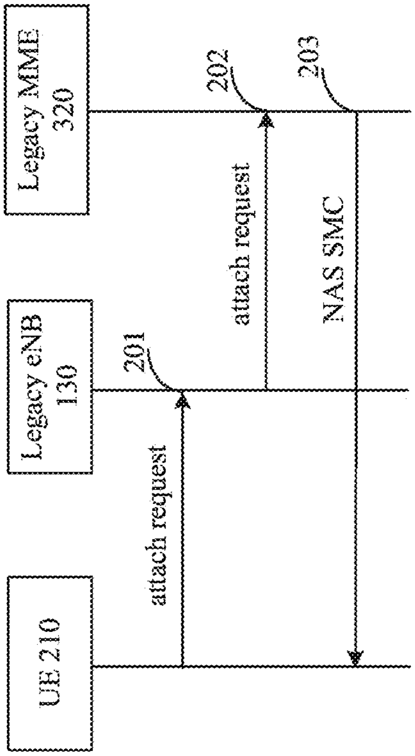
FIG. 2 illustrates a flowchart of UE initial attach to a legacy eNB in an embodiment of the present disclosure.

FIG. 2 illustrates a flow diagram of an embodiment operation in an attach procedure. As shown in FIG. 2, in step 201, the UE 210 sends an attach request message to the legacy eNB 130.

The attach request message includes an UE security capabilities which includes NR security capabilities. Optionally, the UE NR security capabilities are added into a non-access stratum (NAS) UE network capability IE. The UE security capabilities may further include at least one of security capabilities of UE 2G or GERAN security capabilities, UE 3G or UMTS security capabilities, and UE 4G or LTE security capabilities.

In step 202, the legacy eNB 130 sends the attach request message to the legacy MME 320. The attach request message sent to the legacy MME 320 includes the UE security capabilities which include the NR security capabilities.

In step 203, the legacy MME 320 sends a NAS security mode command (SMC) message to the UE 210.

Since the legacy MME 320 does not recognize or understand the UE NR security capabilities included in the attach request message, the legacy MME 320 sends back all the UE security capabilities up to the LTE security capabilities in the NAS security mode command (NAS SMC) message, namely, all the UE security capabilities except the UE NR security capabilities are sent back in the NAS SMC message. For example, if UE 2G security capabilities, UE 3G security capabilities, UE LTE security capabilities, and UE NR security capabilities are included in the attach request message send from the legacy eNB 130 to the legacy MME 320. Due to the legacy MME 320 cannot recognize the UE NR security capabilities, the legacy MME 320 sends the UE 2G security capabilities, the UE 3G security capabilities, and the UE LTE security capabilities in the NAS SMC message.

Thus, the UE 210 receives the NAS SMC message without including the UE NR security capabilities. In an embodiment of the present disclosure, UE 210 may set a flag in an UE Evolved Packet System (EPS) context to indicate that the NR security capabilities never been protected against bidding-down attack. For example, the flag could be set as "NR security capabilities not protected".

In addition, the legacy MME 320 may send the UE security capabilities to the legacy eNB 130 in an S1 application protocol (S1AP) message.

In the initial attach to legacy eNB 130, the UE 210 is attached to LTE air interface and does not need to use its NR security capabilities.

In the initial attach procedure, if the UE 210 receives security capabilities that includes all the UE security capabilities except for the NR security capabilities, the UE 210 may not consider this as a security vulnerability nor a possible bidding-down attack.

However, in this case, the legacy MME 320 may save the UE network capabilities including the UE NR security capabilities in the UE EPS context without having the UE NR security capabilities been replayed against bidding-down attack if the UE NR security capability is included in a same IE with other UE security capabilities, such as the UE 3G security capabilities or the UE LTE security capabilities. As described above, if the UE NR security capability is not a part of the UE radio or network capability IE, i.e., if the UE NR security capabilities are in a different IE from the IE comprising the UE 3G security capabilities or the UE LTE security capabilities, the legacy MME 320 may drop the UE NR security capability IE and the UE NR security capabilities do not get to be saved inside the UE context.

In the present disclosure, a bidding-down attack refers to an attack that an attacker replaces the high security algorithm with a low security algorithm by cheating the network, and degrades the security between the UE and the network side. For example, the man-in-the-middle attack attempts to downgrade the UE to a security algorithm that is less than the highest priority the UE and network supports. This may force the UE to downgrade to an algorithm that is weaker than what the network and the UE support.

To avoid the bidding-down attack, the network element may replay or confirm the security capabilities of a UE. For example, the network element may send the obtained security capabilities to the UE to verify whether the obtained security capabilities are valid and complete. If not, the UE may send a valid and complete security capabilities to the network element.

In the embodiments of the present disclosure, as long as the UE 210 is connected to the LTE network and all UE security capabilities including LTE security capabilities have been replayed correctly and successfully in the NAS SMC message, the UE may not consider the absence of the UE NR security capabilities in the NAS SMC as security vulnerability.

In embodiments of the present disclosure, the UE 210 may perform a handover from a legacy eNB 130 to an enhanced eNB 120. For example, as shown in handover scenarios in FIG. 1, the UE 210 may be handed over from the legacy eNB 130 to the enhanced eNB 120 using the X2 interface or S1 interface.

In a handover from the legacy eNB 130 to the enhanced eNB 120, the legacy eNB 130 may be also called a source eNB, or a source legacy eNB. The enhanced eNB 120 may be also called a target eNB, a target enhanced eNB, or a target MeNB. The legacy MME 320 may be also called a source MME, or a source legacy MME. The eMME 310 may be called a target MME, or a target eMME.

Figure 3:
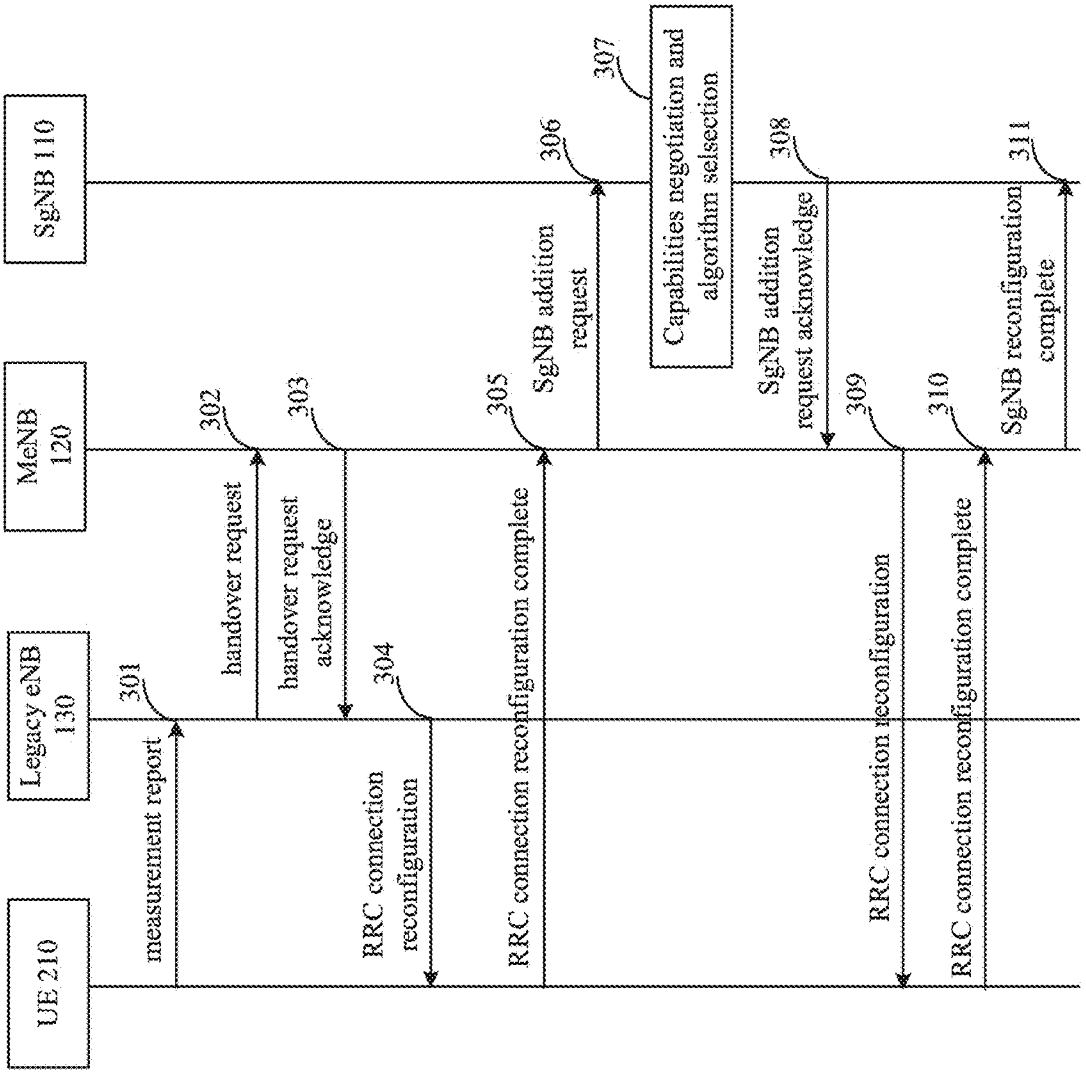
FIG. 3 illustrates a flowchart of an X2 handover and secondary gNB addition in an embodiment of the present disclosure.

FIG. 3 is a diagram for obtaining the UE NR security capabilities in an X2 handover from the legacy eNB 130 to the enhanced eNB 120 of an embodiment of the present disclosure.

In step 301, the UE 210 sends a measurement report to the legacy eNB 130.

In step 302, the legacy eNB 130 sends a handover request message to the MeNB 120.

The legacy eNB 130 decides to trigger a handover for the UE 210 based on the measurement report, and send the handover request message to the MeNB 120.

The legacy eNB 130 may neither have a record of the UE NR security capabilities nor the UE network capabilities related to the NR network.

When the MeNB 120 receives the handover request message from the legacy eNB 130, the MeNB 120 cannot receive the UE NR security capabilities nor the UE network capabilities related to the NR network. Thus, the MeNB 120 may not know if the UE 210 supports the NR network or not.

Therefore, the MeNB 120 cannot add a data radio bearer (DRB) to the SgNB 110 when the MeNB 120 receives the handover request message in the X2 handover. In an embodiment of the present disclosure, during an X2 handover from a legacy eNB 130 to a MeNB 120, the MeNB 120 shall not add a DRB to SgNB until X2 handover is completed.

In step 303, the MeNB 120 sends a handover request acknowledge message to the legacy eNB 130.

If the MeNB 120 does not receive the UE NR security capabilities from the legacy eNB 130 in the handover request message, the handover request acknowledge message includes an indication or a flag to indicate the UE 210 to send the UE NR security capabilities.

In step 304, the legacy eNB 130 sends a radio resource control (RRC) connection reconfiguration message to the UE 210. The RRC connection reconfiguration message may be also referred to as a RRC connection reconfiguration request message. The RRC connection reconfiguration message includes the indication or flag indicating the UE 210 to send the UE NR security capabilities.

In step 305, the UE 210 sends a RRC connection reconfiguration complete message to the MeNB 120. The RRC connection reconfiguration complete message includes the UE NR security capabilities.

It should be noted that the UE security capabilities may be represented by indication information. Thus, sending UE security capabilities in the embodiments of present disclosure also refers to sending indication information of the UE security capabilities.

Moreover, in the embodiment of the present disclosure, after the MeNB 120 receives the RRC connection reconfiguration complete message sent from the UE 210, the target MeNB 120 then obtains the UE NR security capabilities. As shown in FIG. 3, it could further comprise that the MeNB 120 could add a DRB to the SgNB 110.

In step 306, the MeNB 120 sends a SgNB addition request message to the SgNB 110, the SgNB addition request message comprises the UE NR security capabilities.

In step 307, the SgNB 110 allocates resources and chooses the ciphering and integrity algorithms.

In step 308, the SgNB 110 sends SgNB addition request acknowledge message to the MeNB 120 indicating availability of requested resources and the identifiers for the selected algorithm(s) to serve a DRB for the UE 210.

In step 309, the MeNB 120 sends a RRC connection reconfiguration message to the UE 210 to instruct the UE 210 to configure the DRB for the SgNB 110.

In step 310, the UE 210 sends the RRC reconfiguration complete message to the MeNB 120. The UE 210 also activates the chosen encryption/decryption and integrity protection.

In step 311, the MeNB 120 sends a SgNB reconfiguration complete message to the SgNB 110 to inform the SgNB 110 of the configuration result.

On receipt of the SgNB reconfiguration complete message, SgNB 110 may activate the chosen encryption/decryption and integrity protection with UE 210. If SgNB 110 does not activate encryption/decryption and integrity protection with the UE 210 at this stage, SgNB 110 may activate encryption/decryption and integrity protection upon receiving a random access request from the UE 210.

Therefore, according to the embodiment of the present disclosure, the MeNB can obtain the UE NR security capabilities even the source legacy eNB does not have the UE NR security capabilities. Moreover, after the handover from the legacy eNB to the MeNB is finished, due to the MeNB has obtained the UE NR security capabilities, the MeNB can trigger the establishment of an ENDC for the UE to add DRB(s) to the SgNB. Accordingly, the UE can get faster transmission rate, the operator can provide better user experience to users.

Alternatively, in an embodiment of the present disclosure, the MeNB 120 may not send the indication or flag to indicate the UE 210 to send the UE NR security capabilities to the MeNB 120. If a flag that represents that the NR security capabilities NOT protected has been set in the UE EPS context in the UE initial attach to the legacy eNB, the UE 210 may send the UE NR security capabilities in the RRC connection reconfiguration complete message.

Having the UE 210 to send its NR security capabilities in the RRC reconfiguration complete message to the MeNB 120 is straightforward and simple. More particularly, the MeNB 120 can obtain the UE NR security capabilities based on existed procedure without causing any negative impact. Furthermore, it is avoided that the UE needs to send its NR security capabilities during every X2 handover.

Figure 4:
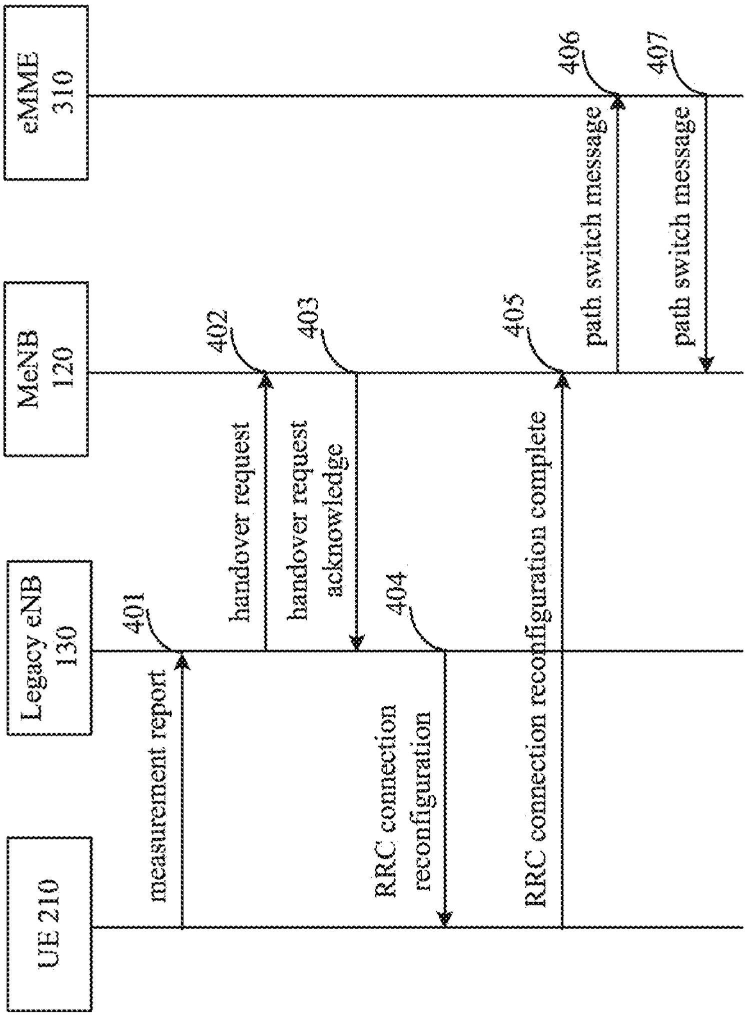
FIG. 4 illustrates a flowchart of an X2 handover in an embodiment of the present disclosure.

FIG. 4 is a diagram of an embodiment operation for the MeNB 120 to obtain the UE NR security capabilities in the X2 handover from the legacy eNB 130 to the MeNB 120. In this embodiment, instead of that the UE sends the UE NR security capabilities in the RRC connection reconfiguration complete message, the MeNB 120 may obtain the UE NR security capabilities from the eMME 310.

In step 401, the UE 210 sends a measurement report to the legacy eNB 130.

In step 402, the legacy eNB 130 decides to trigger a handover to the MeNB 120 for the UE 210 according to the measurement report, and sends a handover request to the MeNB 120.

In step 403, the MeNB 120 sends a handover request acknowledge message to the legacy eNB 130.

In step 404, the legacy eNB 130 sends a RRC connection reconfiguration message to the UE 210.

In step 405, the UE 210 sends a RRC connection reconfiguration complete message to the MeNB 120.

In step 406, the MeNB 120 sends a path switch message to the eMME 310. The path switch message includes an indication to request the UE NR security capabilities from the eMME 310.

In step 407, the eMME 310 sends a path switch acknowledgement message to the MeNB 120. The path switch acknowledgement message comprises the UE NR security capabilities.

In this case, the MeNB 120 may start adding a DRB at the SgNB 110 as soon as receiving the path switch acknowledgement message from the eMME 310. The process of adding DRB(s) at the SgNB 110 may make reference to steps 306 to 311 as described in the embodiment provided in FIG. 3.

Alternatively, since the UE NR security capabilities received from the eMME has not been protected against bidding down attack, the MeNB 120 may replay the UE NR security capabilities or all of the security capabilities including the UE NR security capabilities in the RRC connection reconfiguration message used to add the DRB(s) at the SgNB. After the UE 210 receives the UE NR security capabilities in the RRC connection reconfiguration message, the UE 210 compares the received UE NR security capabilities to the UE's own UE NR security capabilities to ensure no bidding down attack has been performed. If the received NR security capabilities is not same as the UE's own UE NR security capabilities, the UE may send its own NR security capabilities in the RRC connection reconfiguration complete message.

Alternatively, the MeNB 120 may replay the UE NR security capabilities or all of the security capabilities including the UE NR security capabilities in an access stratum (AS) SMC procedure. The AS SMC procedure can be utilized to negotiate the NR security algorithms between the SgNB 110 and the UE 210 while replaying the UE NR security capabilities. In the AS SMC procedure, The MeNB 120 may send the UE NR security capabilities or all of the security capabilities including the UE NR security capabilities in an AS SMC message. The UE 210 compares the received UE NR security capabilities to the UE's own UE NR security capabilities to ensure no bidding down attack has been performed. If the received NR security capabilities is not same as the UE's own UE NR security capabilities, the UE 210 may send its own NR security capabilities in a security mode complete message to the MeNB 120.

Figure 5:
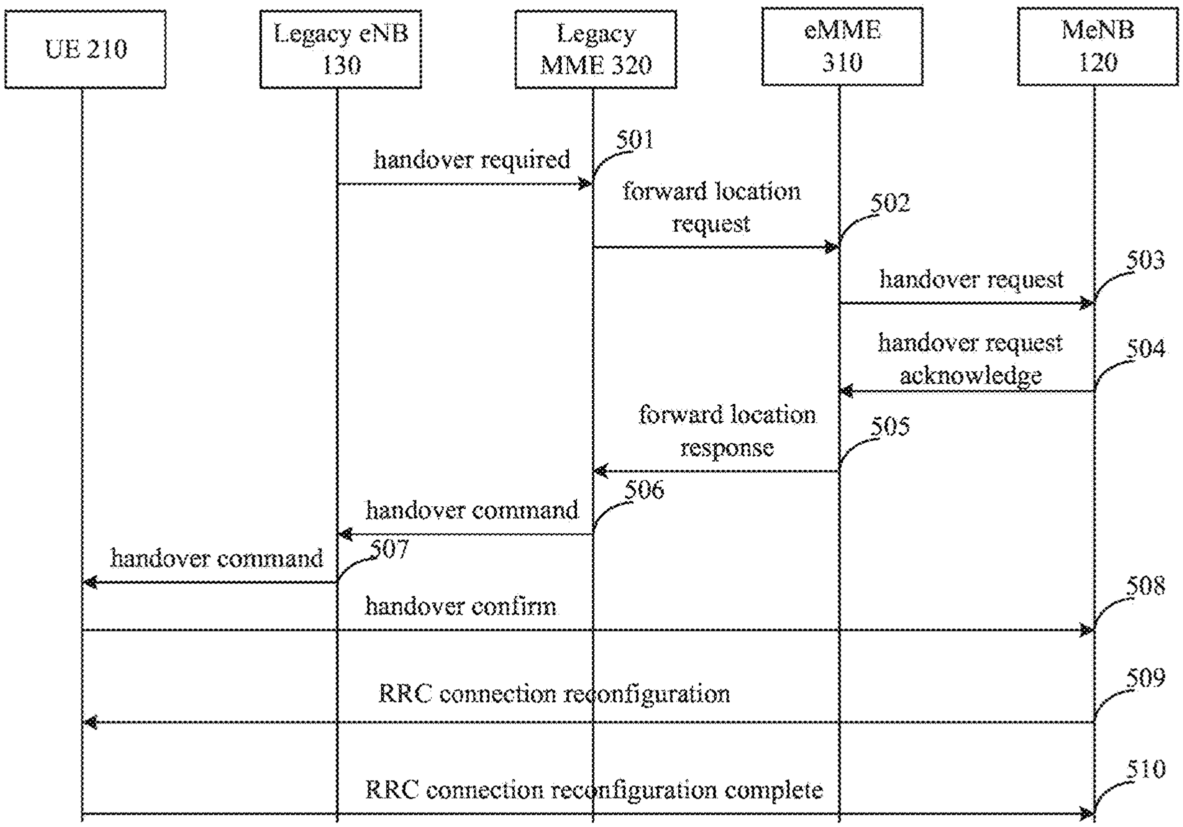
FIG. 5 illustrates a flowchart of an S1 handover in an embodiment of the present disclosure.

FIG. 5 is a diagram of an embodiment of an embodiment operation for obtaining the UE NR security capabilities in the S1 handover from the legacy eNB 130 to the MeNB 120.

In step 501, the legacy eNB 130 sends a handover required message to the legacy MME 320.

The handover required message includes the needed information as per the S1 handover, UE radio capabilities and UE security capabilities.

In step 502, the legacy MME 320 sends a UE context in a forward location request message to the eMME 310. The UE context does not include UE NR security capabilities.

In step 503, the eMME 310 sends a handover request which includes the UE radio capabilities, and UE security capabilities without the UE NR security capabilities to the MeNB 120.

In step 504, the MeNB 120 sends a handover request acknowledge to the eMME 310.

At this moment, the MeNB 120 delays adding SgNB since the UE NR security capabilities is not present.

The MeNB 120 does not receive the UE NR security capabilities as part of the UE context from the eMME 310, or if the MeNB 120 obtains that the UE NR security capabilities has not been protected against bidding-down attack, the MeNB 120 includes a flag or an indication to the UE 210 in the handover request acknowledge message to be passed to the UE 210 for the UE 210 to send the UE NR security capabilities of the UE 210. As an example, this flag or indication may be "UE NR security capabilities NOT protected".

In step 505: The eMME 310 sends a forward relocation response message to the legacy MME 320.

The forward relocation response includes the flag or indication received in the handover request acknowledge message.

In step 506: The legacy MME 320 sends a handover command message to the legacy eNB 130.

The handover command includes the flag or indication received in the forward relocation response message.

In step 507: The legacy eNB 130 sends a handover command message to the UE 210.

The handover command includes the flag or indication to indicate the UE 210 to send the UE NR security capabilities.

In step 508: The UE 210 sends a handover confirm message to the MeNB 120, the handover confirm message includes the UE NR security capabilities.

Optionally, in the S1 handover from the legacy eNB 130 to the MeNB 120, the target MeNB 120 may receive the UE security capability including the UE NR security capabilities from the eMME 310 in the handover request message. The UE NR security capabilities received from the eMME 310 is not protected against bidding-down attack. Since the UE NR security capabilities has not been protected against bidding-down attack and the legacy MME 320 support neither the ENDC functionality nor the UE NR security capabilities, this means that the MeNB 120 cannot start adding DRB(s) at the SgNB 110 except until the S1 handover is completed and the MeNB 120 receives the handover confirm message from the UE 210. Therefore, in the embodiment of the present disclosure, during an S1 handover from an eNB to MeNB 120, the MeNB 120 cannot add DRB(s) to SgNB until S1 handover is completed.

Thus, if the UE 210 includes the UE NR security capabilities in the handover confirm message to the MeNB 120, the MeNB 120 can be able to compare the received UE NR security capabilities to the UE NR security capabilities received from the eMME 310. If they are different, the MeNB 120 may start a RRC connection reconfiguration procedure. As shown in FIG. 5, in step 509, the MeNB 120 sends a RRC connection reconfiguration request message to the UE 210. The RRC connection reconfiguration request message includes an indication or a flag to indicate the UE 210 to send the UE NR security capabilities.

In step 510, the UE 210 send a RRC connection reconfiguration complete message to the MeNB 120. The RRC connection reconfiguration complete message includes the UE NR security capabilities.

It should be noted that the UE security capabilities including the UE NR security capabilities may be represented by indication information, so sending UE security capabilities in the embodiments of present disclosure also refers to sending information of the UE security capabilities.

Alternatively, in an embodiment of the present disclosure, the MeNB 120 may not send the indication or flag to indicate the UE 210 to send the UE NR security capabilities in the handover request acknowledge message. If a flag "NR security capabilities NOT protected" has been set in the UE EPS context in the UE initial attach to the legacy eNB, the UE 210 may send its UE NR security capabilities in the handover confirm message.

In an embodiment, after the MeNB 120 receives the handover confirm message in S1 handover, the MeNB 120 may start the process of adding DRB(s) at the SgNB 110. In the process of adding DRB(s)/SRB(S), the MeNB 120 may replay the UE NR security capabilities in the RRC connection reconfiguration message used to add DRB(s) at the SgNB 110. The MeNB 120 may replay the UE NR security capabilities or all of the security capabilities including the UE NR security capabilities in the RRC connection reconfiguration message used to add a DRB at the SgNB 110.

After the UE 210 receives the UE NR security capabilities in the RRC connection reconfiguration message, the UE 210 compares the received UE NR security capabilities to the UE's own UE NR security capabilities to ensure no bidding down attack has been performed. If the received NR security capabilities is same as the UE's own UE NR security capabilities, the process of adding the DRB could be continued. If the received NR security capabilities is not same as the UE's own UE NR security capabilities, the UE 210 may send its own NR security capabilities in the RRC connection reconfiguration complete message.

Alternatively, the MeNB 120 may replay the UE NR security capabilities or all of the security capabilities including the UE NR security capabilities in an access stratum (AS) SMC procedure. The AS SMC procedure can be utilized to negotiate the NR security algorithms between the SgNB 110 and the UE 210 while replaying the UE NR security capabilities. In the AS SMC procedure, The MeNB 120 may send the UE NR security capabilities or all of the security capabilities including the UE NR security capabilities in an AS SMC message. The UE 210 compares the received UE NR security capabilities to the UE's own UE NR security capabilities to ensure no bidding down attack has been performed. If the received NR security capabilities is not same as the UE's own UE NR security capabilities, the UE may send its own NR security capabilities in a security mode complete message to the MeNB 120.

An embodiment of the present disclosure provides other solutions for the MeNB 120 to obtain the UE NR security capabilities. In this embodiment, the MeNB 120 can obtain the UE NR security capabilities neither from the UE 210 nor from the eMME 310 in the X2 or S1 handover. The MeNB 120 may obtain the UE NR security capabilities after the X2 or S1 handover is completed.

Due to the legacy eNB 130 and the enhanced eNB 120 in embodiments of the present disclosure belong to different TAs, when the UE 210 hands over from legacy eNB 130 to MeNB 120, the UE 210 can trigger a TAU procedure and send its UE NR security capabilities to the eMME 310.

Figure 6:
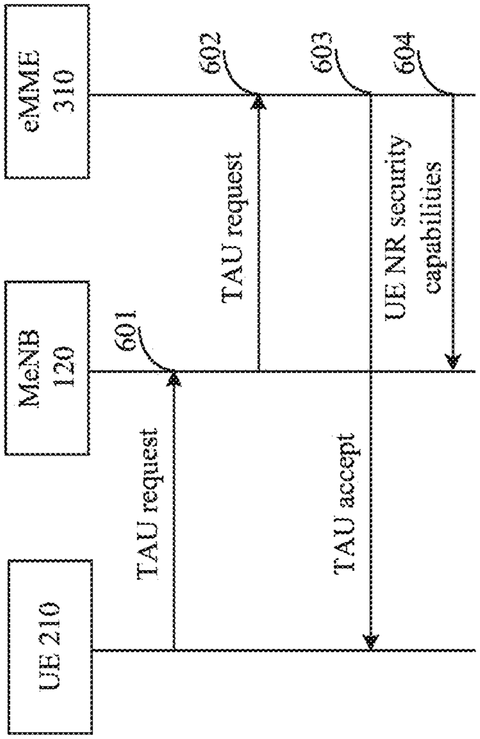
FIG. 6 illustrates a flowchart of a TAU procedure in an embodiment of the present disclosure.

FIG. 6 is a diagram of an embodiment of an embodiment operation for triggering the TAU procedure. In step 601, the UE 210 sends a TAU request message to the MeNB 120, the TAU request message comprises the UE NR security capabilities.

In step 602, the MeNB 120 sends the TAU request message to the eMME 310. The TAU request message comprises the UE NR security capabilities.

In step 603, the eMME 310 sends a TAU accept message to the UE 210.

When the eMME 310 receives the TAU request and finds out that UE security capabilities received from the UE 210 in the TAU request message are different from UE security capabilities from a legacy MME 130, the eMME 130 replays back the UE security capabilities in the TAU accept message to the UE 210.

In step 604, the eMME 130 delivers the UE NR security capabilities to the MeNB 120.

The eMME 310 may send the UE security capabilities including the UE NR security capabilities to the MeNB 120 in an S1AP message.

Alternatively, to ensure the UE can trigger the TAU procedure immediately as soon as the X2 or S1 handover is finished, a TAU trigger or cause value or indication may be sent to the UE during the X2 or S1 procedure, the TAU trigger or cause value or indication indicates a TAU is required. For example, the TAU trigger or the cause value or indication may be "TAU Required: UE Security Capabilities Mismatch", or "TAU Required: UE NR Security Capabilities is required". It should be noted that this indication is just an example, the present disclosure also includes any indication, trigger or cause value indicating a TAU procedure is required to send the UE NR security capabilities.

Figure 7:
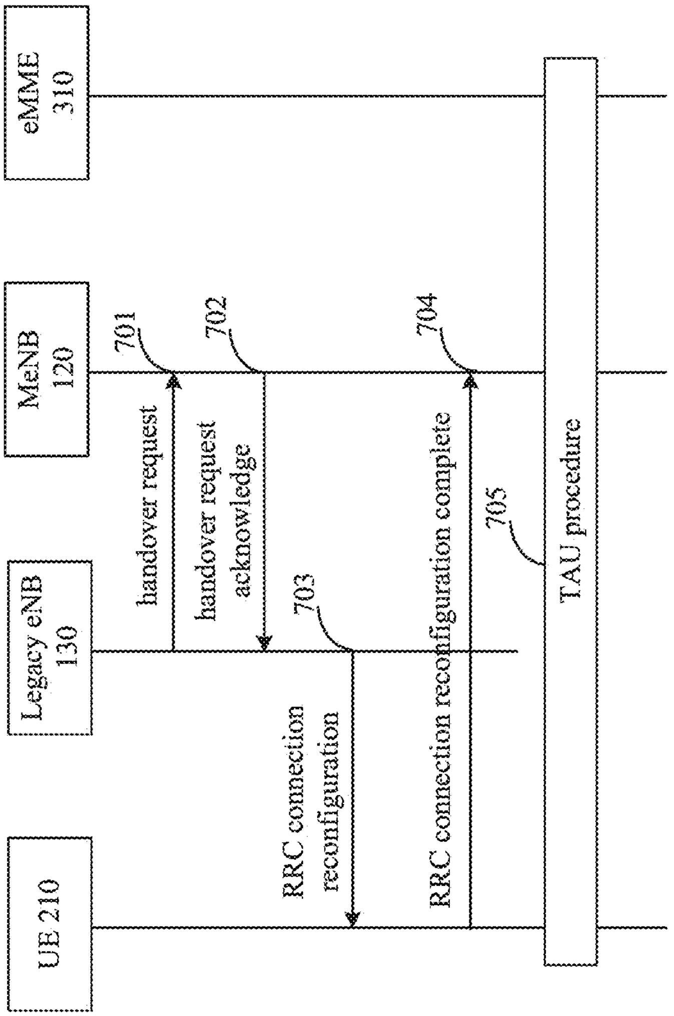
FIG. 7 illustrates a flowchart of a method in an embodiment of the present disclosure.

FIG. 7 is a diagram of an embodiment of the present disclosure for triggering a TAU procedure. In this embodiment, the TAU trigger or cause value or indication could be sent in the X2 handover, so that a TAU procedure may be triggered immediately when the X2 handover is finished.

In step 701, the legacy eNB 130 sends a handover request message to the MeNB 120.

In step 702, the MeNB 120 sends a handover request acknowledge message to the legacy eNB 130.

The handover request acknowledge message may include a TAU trigger or cause value or indication, the TAU trigger or the cause value or indication may be "TAU Required: UE Security Capabilities Mismatch".

In step 703, the legacy eNB 130 sends a RRC connection reconfiguration message to the UE 210.

The RRC connection reconfiguration message comprises the TAU trigger or the cause value or indication may be "TAU Required: UE Security Capabilities Mismatch".

In step 704, the UE 210 sends a RRC connection reconfiguration complete message to the MeNB 120.

In step 705, the UE 210 triggers the TAU procedure to send the UE NR security capabilities to the MeNB 120.

The process of sending the UE NR security capabilities by triggering the TAU procedure may be referred to the embodiment described in FIG. 6.

Alternatively, the trigger or cause value or indication for indicating a TAU procedure is required to send the UE NR security capabilities also could be included in other downlink message sent to the UE in the X2 handover procedure.

Figure 8A:
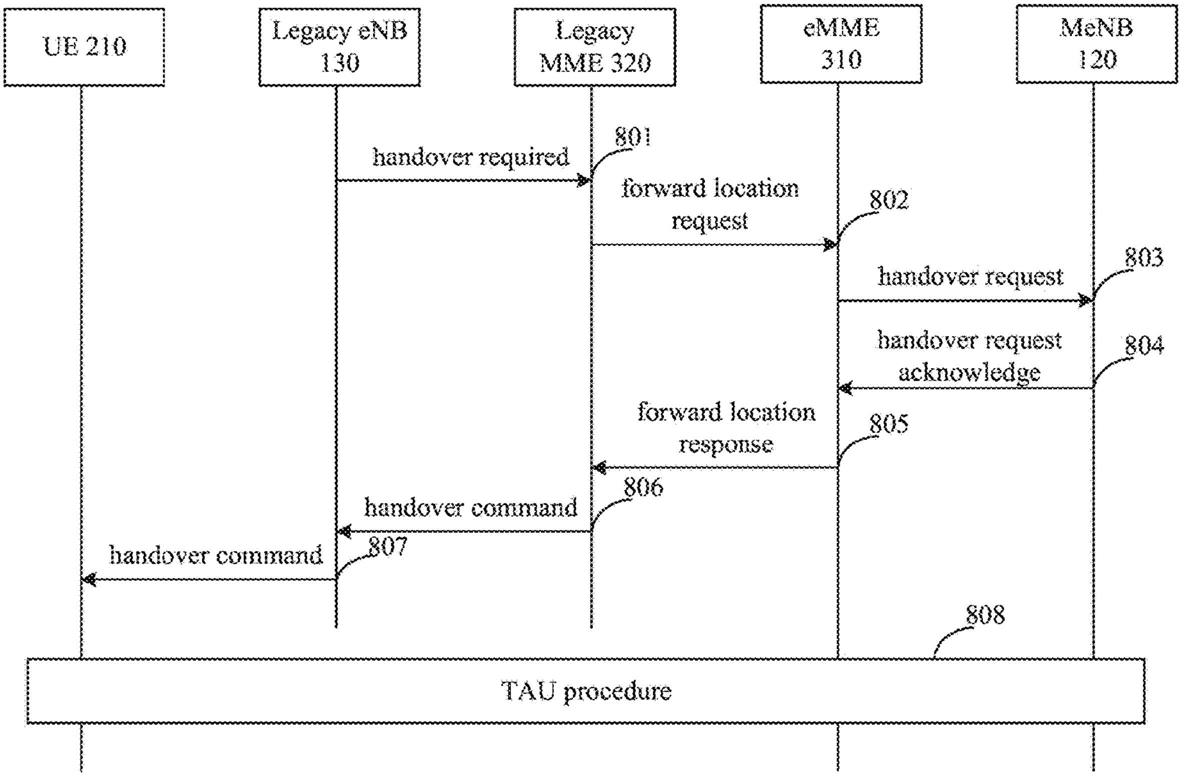
FIG. 8A illustrates a flowchart of a method in an embodiment of the present disclosure.

FIG. 8 is a diagram of an embodiment for triggering a TAU procedure. The TAU trigger or cause value or indication may be sent to the UE in S1 handover.

In step 801, the legacy eNB 130 sends a handover required message to the legacy MME 320. The handover required message includes the needed information as per the current S1 handover, UE radio capabilities and UE security capabilities.

In step 802, the legacy MME 320 sends the UE context in a forward location request message to the eMME 310. The UE context does not include the UE NR security capabilities.

In step 803, the eMME 310 sends a handover request message that includes the UE radio capabilities, UE security capabilities without NR security capabilities to the MeNB 120.

In step 804, the MeNB 120 sends a handover request acknowledge message to the eMME 310.

The MeNB 120 includes a flag or cause value or indication to be sent to UE 210 in the handover request acknowledge message. The flag or cause value or indication could be "TAU Required: UE Security Capabilities Mismatch" in the handover request acknowledge message.

In step 805: The eMME 310 sends a forward relocation response message to the legacy MME 320.

The forward relocation response message includes the flag or cause value or indication received in the handover request acknowledge message.

In step 806: The legacy MME 320 sends a handover command message to the legacy eNB 130.

The handover command message includes the flag or cause value or indication received in the forward relocation response.

In step 807: The legacy eNB 130 send a handover command message to the UE 210.

The handover command includes the flag or cause value or indication.

In step 808: When UE 210 receives the trigger or cause value or indication, the UE 210 triggers the TAU procedure to send the UE NR security capabilities.

The process of sending the UE NR security capabilities by triggering the TAU procedure may be referred to the embodiment described in FIG. 6.

Alternatively, the trigger or cause value or indication for indicating a TAU procedure is required to send the UE NR security capabilities also could be included in other downlink message sent to the UE in the S1 handover procedure.

According to the TAU procedure, the MeNB 120 may receive the UE NR security capabilities from the eMME in a secure manner that is not vulnerable to bidding-down attack.

After the MeNB 120 receives the UE NR security capabilities from the MME, the MeNB 120 starts adding the SgNB, i.e., adding DRB(s)/SRB to the gNB. The process could be made reference to steps 306 to 311 as described in the embodiment shown in FIG. 3.

In embodiments of the present disclosure, when a UE hands over from a legacy eNB connected to a legacy MME to MeNB 120 that is connected to eMME, UE NR security capabilities protection could be indicated to make sure the eMME knows whether the UE NR security capabilities have been protected against bidding-down attack or not.

Since the UE includes its NR security capabilities in the currently defined UE network capability IE, the legacy MME can save the UE NR security capabilities in the UE EPS context without understanding it exists. The legacy MME cannot be able to indicate to the eMME that whether the UE NR security capabilities are protected against bidding-down attack or not. Thus, in one embodiment, an absence of the indication to the target eMME may mean the UE NR security capabilities were not protected against bidding-down attack. When eMME transfers a UE EPS context with the UE NR security capabilities included, it can indicate whether the UE NR security capabilities has been protected against bidding down or not.

Alternatively, in one embodiment, UE NR security capabilities protection could be indicated by utilizing the capabilities exchange mechanism between MME. If the source MME support neither the ENDC function nor the attach hashing feature, and the eMME receives a UE EPS context with the UE NR security capabilities included, the eMME may consider the UE NR security capabilities as it has never been protected against bidding-down attack.

The UE NR Security capabilities protection could be indicated to make sure the eMME knows whether the UE NR security capabilities have been protected against bidding-down attack or not. It is important for the MeNB 120 to avoid an unnecessary procedure for protecting the UE NR security capabilities.

As illustrated in FIG. 1, in an embodiment of the present disclosure, the UE can attach to the enhanced eNB. The UE sends an attach request message to the MeNB 120, the attach request message may include UE security capabilities, which includes UE NR security capabilities. The UE may also send an attach request hash to the MeNB 120. Since the UE is attaching to MeNB 120 with eMME, the eMME recognizes and understand the UE NR security capabilities. The eMME can support the ENDC feature and the attach request hash validation in order to avoid a bidding-down attack on the UE NR security capabilities.

The eMME supports the attach request and attach request hash, and replays the UE security capabilities in the NAS SMC message and the attach request hash may defeat any bidding-down attack against the UE NR security capabilities. In addition, the eMME may deliver the UE security capabilities to the MeNB 120 in an S1AP message.

According to all embodiments of the present disclosure, when the UE is attached to a legacy eNB that is connected to a legacy MME, a mechanism is provided to protect the UE NR security capabilities. In addition, when the UE handover from legacy eNB to MeNB 120 with eMME, the UE NR security capabilities could be obtained by the MeNB 120, and the UE NR security capabilities could be protected against bidding-down attack.

In embodiments of the present disclosure, as long as an UE is connected to a LTE network and all UE security capabilities including LTE security capabilities have been replayed correctly and successfully in the NAS SMC, the UE may not consider the absence of the UE NR security capabilities in the NAS SMC as security vulnerability. Optionally, the UE may save a flag in its UE EPS context to indicate that the NR security capabilities never been protected against bidding-down attack. UE security capabilities saved in the UE context at a legacy MME includes UE NR security capabilities which has not been secured against bidding-down attack. This UE context can be called “Legacy EPS Context”. The MeNB may be connected to an enhanced MME that supports ENDC5 features and support attach request hash validation in order to avoid bidding-down attack on the UE NR security capabilities. During an X2 handover from an eNB to the MeNB, the MeNB may not add DRB(s) to a SgNB until the X2 handover is complete. During an S1 handover from an eNB to the MeNB, the MeNB shall not add DRB(s) to a SgNB until the S1 handover is complete.

In embodiments of present disclosure, some solutions are applied for indication UE NR security capabilities has not been protected:

In one example, a clear indication may come from a source eMME to indicate whether the UE NR security capabilities have been protected against bidding-down attack or not. The absence of the indication means that the UE NR security capabilities have not been protected against bidding-down attack. i.e., the UE NR security capabilities are received from a legacy MME.

Alternatively, a solution could utilize the capabilities exchange mechanism between the MME. If the source MME does not support the ENDC5 nor the attach hashing feature and the target eMME receives a UE EPS context with the UE NR security capabilities included, the eMME may consider the UE NR security capabilities as it has never been protected against bidding-down attack.

In embodiments of the present disclosure, below solutions may work for both an X2 and S1 handover.

For an X2 Handover from an eNB to a MeNB, the UE may include its NR security capabilities in the RRC connection reconfiguration complete message to a target MeNB. For a S1 Handover, the UE may include its NR security capabilities in the Handover Confirm message to a target MeNB. The UE sends its UE NR security capabilities in a RRC connection reconfiguration complete message for an X2 handover and in a handover confirm message for an S1 handover if the UE EPS context has the flag “NR security capabilities NOT protected” is set. The UE sends its UE NR security capabilities in a RRC connection reconfiguration complete message for the X2 handover and in a handover confirm message for the S1 handover if the UE receives an indication “UE NR security Capabilities NOT protected” from the target MeNB.

Alternatively, the target MeNB may use the procedure for adding DRB(s) to the SgNB to replay the UE NR security capabilities. This may be achieved by the target MeNB including the UE NR security capabilities in the RRC connection reconfiguration message sent to the UE. If the UE receives UE NR security capabilities that is different than what the UE supports, the UE may include its UE NR security capabilities in the RRC connection reconfiguration complete message sent to the target MeNB. If the target MeNB receives the UE NR security capabilities in the RRC connection reconfiguration complete message, the target MeNB may renegotiate the SgNB security with the UE.

In another example, after the X2 handover is completed, the UE may trigger a tracking area update procedure and thus the UE may include its security capabilities including its NR security capabilities in the TA update message. Alternatively, after the S1 handover is completed, the UE may trigger a tracking area update procedure and thus the UE will include its security capabilities including its NR security capabilities in the TA update message. In this way, the MeNB may receive the UE NR security capabilities from the eMME in a secure manner that is not vulnerable to bidding-down attack. The target MeNB may add DRB(s) to the SgNB after TAU procedure is complete.

In embodiments of the present disclosure, below solutions are provided.

For a UE's NR security capabilities protection. In an initial context setup, if during the UE attach procedure to the LTE network, the UE receives all UE security capabilities replayed in a NAS SMC message except for the UE NR security capabilities, the UE may not consider this as a possible bidding-down attack and may continue the attach procedure. During the UE initial attach to a MeNB, the MME may include the UE's NR security capabilities in the initial context setup request message and send the initial context setup request message to the MeNB.

During the UE LTE attach procedure, if the UE receives all UE security capabilities replayed in a NAS SMC message except for the UE NR security capabilities, the UE may set a flag "NR Security Capabilities NOT Protected" in the UE EPS context.

In an example, in an S1 handover, the target MME may include the UE's NR security capabilities in the handover request message and send the handover request message to the target eNB (MeNB) as specified in 3GPP TS 36.413. If the target MeNB does not receive the UE NR security capabilities from the target MME eNB, the target MeNB may not start the process of adding the SgNB until the X2 handover is completed. If the target MeNB does not receive the UE NR security capabilities as a part of the UE context from the target MME, or the target MeNB receives the UE NR security capabilities with a flag that the UE NR security capabilities has not been protected against a bidding-down attack, the MeNB may not start adding the SgNB until the S1 handover is completed. After the S1 handover is completed, the target MeNB may use the UE NR security capabilities which are received in the handover confirm when adding the SgNB.

In an embodiment of the present disclosure, if the "NR Security Capabilities NOT Protected" flag in the UE EPS context is set, the UE may send the UE NR security capabilities in the handover confirm message to the target MeNB. Alternatively, if the target MME receives the UE EPS security context from the source MME over S10 interface without an indication that the UE NR security capabilities has been protected against a bidding-down attack, the target MME may update the UE EPS context with a flag to indicate the UE NR security capabilities are not protected. The MME may indicate to the MeNB whether the UE NR security capabilities has been protected against a bidding-down attack or not in the handover request message. If the target MeNB does not receive the UE NR security capabilities as a part of the UE context from the target MME or receives it with a flag indicating the UE NR security capabilities has not been protected against bidding-down attack, the MeNB may include a flag "UE NR security Capabilities NOT Protected" in the handover request acknowledge message to be passed to the UE. If the UE receives an indication "UE NR security Capabilities NOT Protected" in the handover command message, the UE may include its NR security capabilities in the handover confirm message being sent to the target MeNB.

In an example of the present disclosure, if the source eNB supports UE's NR security capabilities, which means the eNB is able to handle or recognize them, the source eNB may include the UE's NR security capabilities in the handover request message to the target eNB (MeNB). If the target MeNB does not receive the UE NR security capabilities from the source eNB, the target MeNB may not start the process of adding the SgNB until the X2 handover is completed. After X2 handover is completed, the target MeNB may use the UE NR security capabilities received in the RRC connection reconfiguration complete message when adding the SgNB.

In embodiments of the present disclosure, during an X2 handover, if the "NR Security Capabilities NOT Protected" flag is set in the UE EPS context, the UE may send the UE NR security capabilities in the RRC connection reconfiguration complete message to the target MeNB. Alternatively, if the target MeNB does not receive the UE NR security capabilities as a part of the UE context from the source eNB in the handover request message, the MeNB may set a flag "UE NR security Capabilities NOT Protected" in the handover request acknowledgement message. This flag to be passed to the UE. During an X2 handover, if the UE receives an indication "UE NR security Capabilities NOT Protected" in the RRC connection reconfiguration message, the UE may include its NR security capabilities in the RRC connection reconfiguration complete message.

In embodiments of the present disclosure, below solutions are provided.

In the ENDC Dual Connectivity option 3, the master node is an eNB, i.e., the MeNB, using LTE air interface while the secondary node is a next generation (5G) NB, i.e. the secondary NB (SgNB). The core network is an EPC network.

Deploying ENDC option 3 requires changes to a legacy MME to support the ENDC feature. An updated or enhanced MME is referred to as an eMME. A MME which does not support the ENDC feature nor the attach request hashing is referred to as a legacy MME.

When the UE initially attaches to a MeNB which is connected to an eMME, the current negotiation of UE security capabilities works based on the current principles of the LTE network and a NAS protocol, and the UE security capabilities is always protected against bidding down attack.

However, the issue is when the UE is attached to a legacy eNB which is connected to a legacy MME, there is no mechanism to protect the UE NR security capabilities. In addition, when the UE hands over from a legacy eNB/MME to a MeNB with an eMME, the UE NR security capabilities could have been lost or not have been protected against bidding-down attack. When the UE which supports ENDC functionality attaches to a legacy eNB which is connected to a legacy MME, there is no mechanism to protect the UE NR security capabilities.

The embodiments of the present disclosure provide several solutions to address the issue of protecting the UE NR security capabilities delivery to the MeNB when the UE hands over from a legacy eNB/MME to a MeNB/eMME, and to provide a mechanism to ensure the secure delivery of UE NR security capabilities during the UE hands over from the legacy eNB/MME to the MeNB which is connected to an eMME. This solution utilizes existing mechanisms but at the same time ensure a secure delivery of UE NR security capabilities and protection against bidding-down attack.

The proposed solutions builds on the same procedures for an X2 and S1 handover as documented in 3GPP TS 23.401.

In an UE initial attach to a legacy eNB, a UE sends an attach request. The attach request includes UE security capabilities including UE NR security capabilities. Since the UE is attaching to a legacy eNB with legacy MME, the legacy MME cannot recognize or understand the UE NR security capabilities that is possibly sent in UE network capability IE. Therefore, the legacy MME may replay back the UE security capabilities up-to LTE security capabilities in a NAS SMC message. The UE may receive the NAS SMC message with replayed security capabilities that does not include the UE NR security capabilities. In addition, the legacy MME may send the UE security capabilities to eNB in SAP message without the NR security capabilities. The UE behavior in this scenario does not cause a security vulnerabilities and possibly a bidding-down attack because that the UE is attached to a LTE air interface and does not need to use its NR security capabilities. If an attacker is able to replace the UE security capabilities in the attach request message by only removing the UE NR security capabilities, this attack will not reduce the UE security while being attached to the LTE network. Thus, if the UE receives a replayed security capabilities that includes UE security capabilities except for the UE NR security capabilities, the UE does not consider this as a security vulnerability nor a possible bidding-down attack. In this case, the legacy MME may save all of the UE network capabilities including the UE NR security capabilities in UE EPS context without having the UE NR security capabilities been replayed against bidding-down attack.

Thus, as long as the UE is connected to the LTE network, and the UE security capabilities including LTE security capabilities have been replayed correctly and successfully in the NAS SMC message, UE may not consider the absence of UE NR security capabilities in the NAS SMC message as a security vulnerability. The UE may save a flag in its UE EPS context to indicate that the NR security capabilities never been protected against bidding-down attack.

The UE security capabilities saved in the UE context at the legacy MME includes UE NR security capabilities which has not been secured against bidding-down attack. This context can be called "Legacy EPS Context".

In a X2 handover from a legacy eNB to MeNB, a legacy eNB does not have a record of the UE NR security capabilities nor UE network capabilities related to the NR network as this is a legacy eNB. When the MeNB receives the handover request message from a source eNB, the target MeNB does not receive the UE NR security capabilities nor the UE network capabilities related to the NR network. Thus, the MeNB does not know if the UE supports NR or not. This means that the MeNB does not be able to add any DRB(s) to SgNB at this moment of X2 HO. Thus, during an X2 handover from an eNB to the MeNB, the MeNB may not add DRB(s) to an SgNB until the X2 handover is completed.

The UE may include its NR security capabilities in a RRC connection reconfiguration complete message sent to the target MeNB during the handover. The target MeNB may include an indication in the path switch message to the target eMME to send UE security capabilities in the path switch acknowledgement message.

In another embodiment of the present disclosure, in a S1 handover from a legacy eNB to a MeNB, the target MeNB receives UE security capability including the UE NR security capabilities from the target eMME in the handover request message. The UE NR security capabilities which is received from the target eMME is never been protected against bidding-down attack. Since the UE NR security capabilities has never been protected against bidding-down attack and the source MME does not support the ENDC5 nor the UE NR security capabilities (i.e., the source MME is a legacy MME), this means that the target MeNB cannot start adding DRB(s) at the SgNB except until the S1 handover is completed and the target MeNB receives the handover confirm message from the UE. Thus, during an S1 handover from an eNB to an MeNB, the MeNB does not add DRB(s) to the SgNB until S1 the handover is completed.

In same example, when a UE handover from a legacy eNB which is connected to a legacy MME to a MeNB that is connected to eMME, there may be a mechanism to indicate to the target eMME whether the UE NR security capabilities has been protected against bidding-down attack or not.

In one example, the UE includes its NR security capabilities in existing UE network capability IE in a NAS attach request message.

The UE includes the NR security capabilities in the UE Network Capability IE in an attach request. The legacy MME may save the UE NR security capabilities in the UE EPS context without understanding it exists. The legacy MME cannot indicate to the target eMME that the NR security capabilities is protected or NOT. Absence of indication to target eMME means the UE NR security capabilities is NOT protected. When any eMME transfers a UE EPS context with NR security capabilities, the eMME indicates whether the UE NR security capabilities has been protected against bidding down or not.

Alternatively, if a source MME does not support the ENDC5 nor the attach hashing and a target eMME receives the UE context with NR security capabilities, the eMME may consider the NR security capabilities was not protected.

In either an X2 or a S1 handover, after the handover is completed, the target MeNB may use the procedure for adding DRB(s) to the SgNB to replay the UE NR security capabilities. This may be achieved by the target MeNB includes the UE NR security capabilities in the RRC connection reconfiguration request message sent to the UE. If the UE NR security capabilities that is received by the UE is different than what the UE NR security capabilities, the UE may include its UE NR security capabilities in the RRC connection reconfiguration complete message sent to the target MeNB. If the target MeNB receives the UE NR security capabilities in the RRC connection reconfiguration complete message which is different than what it has sent to the UE, the target MeNB may renegotiate the SgNB security with the UE.

In either the X2 or S1 handover, after the handover is completed, the UE may trigger a tracking area update procedure and thus the UE may include its security capabilities including its NR security capabilities in the TAU message.

In some examples, the UE NR radio capability is added as part of the current UE Radio Capability IE. This allows the legacy eNB to save the UE NR Radio capability without the need to support it or understand it. It also allow the legacy MME to store the UE NR security capability as part of the UE Radio capability. The advantage of this way of coding the UE NR Radio capability is that during an X2 or S1 handover, the MeNB may receive the UE radio capability either from the source legacy eNB or through the legacy MME. Since the MeNB supports the UE NR radio capability, the MeNB can understand that the UE supports the NR radio and use that in making its decision during the X2 or S1 handover as explained in this solution.

Alternatively, the UE NR Security Capabilities may not be added as part of the UE Network Capabilities. When the UE communicates its NR security capabilities, the NR UE security capabilities may be added as a new IE other than the UE network capability IE. This may cause any legacy MME to drop the NR security capabilities IE and does not get them to be save inside the UE context. In this way, during the S1 handover and when the legacy MME sends the UE context, the enhanced MME does not receive the UE NR security capabilities from a legacy MME. This also means that if the MeNB receives the UE NR Radio capability and does not receive the UE NR security capabilities during the X2 or S1 handover from the source legacy eNB or the MME, this is considered as an indication to the MeNB to not add the SgNB during this specific handover.

In embodiments of the present disclosure, the UE triggers the TAU procedure after an X2 or S1 handover from the legacy eNB to the MeNB is completed.

When an operator updates its network to support the ENDC function, the operator ensures that legacy eNB and MeNB belongs to different tracking areas. In this way, when the UE handover from legacy eNB to MeNB, the UE may trigger the TAU procedure and send its UE NR security capabilities to the MME.

Alternatively, identify a trigger or a cause value, e.g., “TAU Required: UE Security Capabilities Mismatch” that can be sent to the UE during the X2 or S1 handover. When the UE receives such trigger, the UE may perform the TAU procedure after the handover is completed, i.e., after the UE sends an RRC connection reconfiguration complete message in the X2 handover, or after the UE sends a handover confirm message in the S1 handover.

When the eMME receives the TAU message and finds out that there is an update to the UE security capabilities that is different than what was received from the legacy MME, i.e., NR security capabilities is present in the process of the TAU procedure and sends the TAU accept message while replaying the UE security capabilities. In addition, the eMME sends the UE security capabilities including the UE NR security capabilities to the MeNB in the S1AP message. After the MeNB receives the UE NR security capabilities from the legacy MME, the MeNB starts adding the SgNB, i.e., Adding DRB(s)/SRB to the gNB.

Figure 8B:
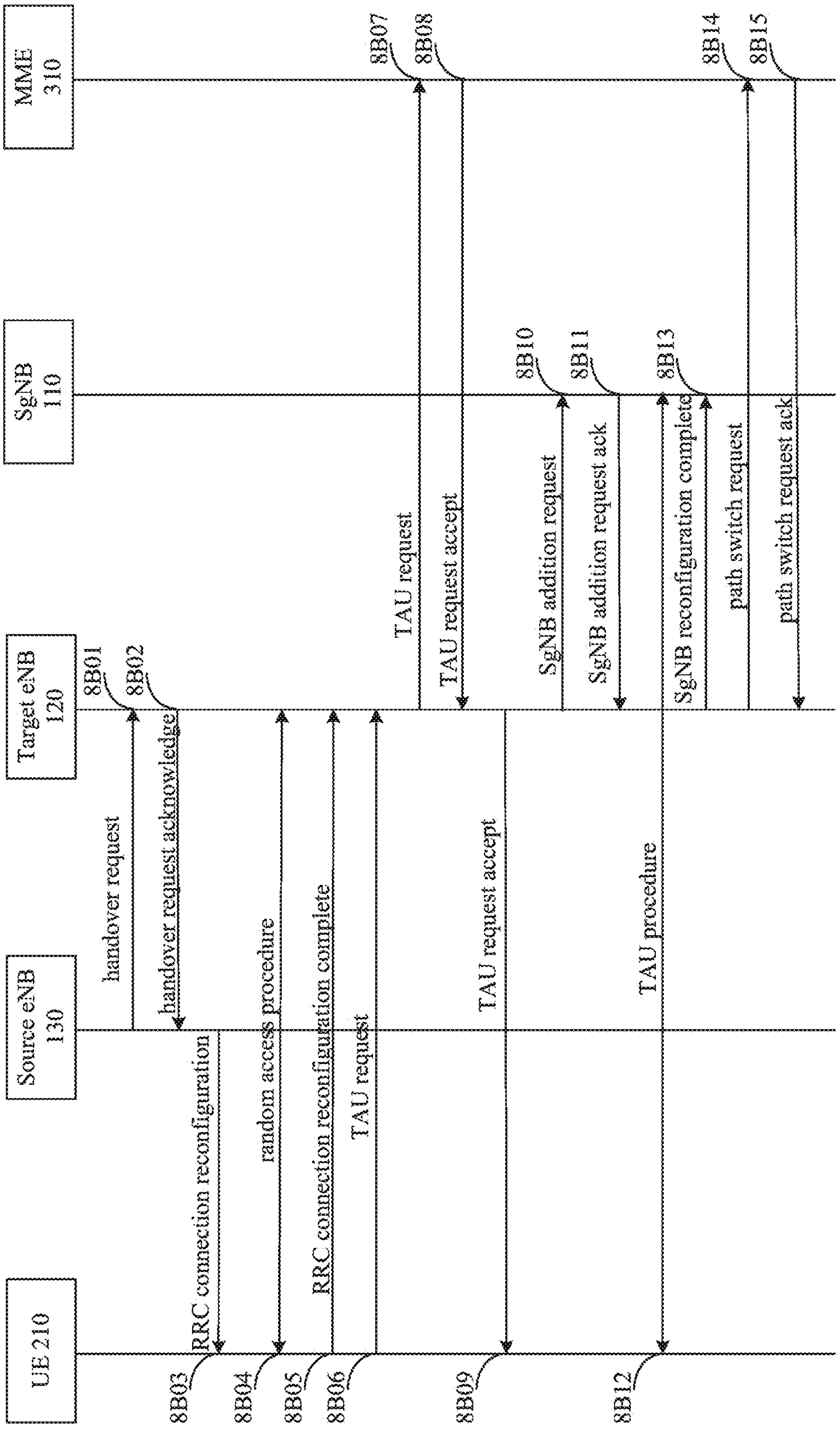
FIG. 8B illustrates a flowchart of a method in an embodiment of the present disclosure.

FIG. 8B is a diagram of an embodiment operation of an X2 handover from the legacy eNB to the MeNB and an SgNB addition procedure.

In step 8B1, the source eNB 130 transmits a handover request message to the target eNB 120. The handover request message may include a UE context. In some embodiments, the UE context includes the UE 5G NR radio capabilities, but does not include the UE NR security capabilities.

In step 8B02, the target eNB 120 receives the handover request message. Since the UE context does not comprise the UE NR security capabilities, the target eNB 120 knows that the UE 120 is capable of operating the NR network. Thus, although the handover may be completed, the target eNB 120 decides to delay to add a DRB at the SgNB 110. The target eNB 120 transmits a handover request acknowledge message to the source eNB 130. The handover request acknowledge message may include a trigger to trig a TAU procedure. Optionally, the handover request acknowledge message may comprise the NR radio capabilities. No NR security capabilities are included.

In step 8B03, the source eNB 130 transmits an RRC connection reconfiguration message to the UE 210. Optionally, the RRC connection reconfiguration message may comprise the information received from the target eNB 120. In some embodiments, the RRC connection reconfiguration message may include a flag or indicator instructing the UE 210 to perform a tracking area update upon the completion of the handover procedure. In some embodiments, the RRC connection reconfiguration message may also include information to establish a security association with the target eNB 120. The UE 210 can therefore establish a LTE security association with the target eNB 120. Correspondingly, the target eNB 120 may establish the same security association with the UE 210 upon completion of the handover procedure.

In step 8B04, the UE 210 and the target eNB 120 perform a random access procedure to allocate resources for a communication between the UE 210 and the target eNB 120.

In step 8B05, the UE 210 transmits an RRC connection reconfiguration complete message to the target eNB 120.

In step 8B06, the UE 210 transmits a TAU request message to the target eNB 120. The TAU request message may be in response to the flag or indicator from the target eNB 120 or in response to entering a new tracking area. The tracking area update request message is protected by the security association between the UE 210 and the target eNB 120.

In step 8B07, the target eNB 120 transmits the TAU request to the MME 310.

In step 8B08, the MME 310 transmits a TAU accept message to the target eNB 120. The TAU accept message may include the UE NR security capabilities. In some examples, the TAU accept message includes the UE LTE security capabilities. The target eNB 120 receives the UE NR security capabilities.

In step 8B09, the target eNB 120 transmits a TAU accept message to the UE 210.

In step 8B10, the target eNB 120 transmits a SgNB addition request message to the SgNB 110.

In step 8B11, the SgNB 110 transmits a SgNB addition request acknowledge message to the target eNB 120.

In step 8B12, the UE 210 perform a TAU procedure with the SgNB 110.

In step 8B13, the target eNB 120 transmits a SgNB reconfiguration complete message to the SgNB 110.

In step 8B13, the target eNB 120 transmits a path switch request message to the MME 310. In step 8B14, the MME 310 transmits a path switch request acknowledge message to the target eNB 120.

In an embodiment of SgNB addition after a S1 handover from the legacy eNB to the MeNB S1, the source legacy eNB sends a handover required message to the source legacy MME. It includes the needed information as per the current S1 handover, UE Radio Capabilities and UE security capabilities. The source legacy MME sends the UE context in the forward location request to the target MME, the UE context does not include the UE NR security capabilities. The target MME sends a handover request message which includes the UE Radio Capabilities, the UE security capabilities without including the NR security capabilities. The MeNB delays adding SgNB since the UE NR security capabilities is not present. The MeNB may include a flag to be sent to the UE “TAU Required: UE Security Capabilities Mismatch”. The MeNB sends a handover request acknowledge message to the target MME which continues the S1 Hanover process as in the 3GPP TS 23.401.

After the MeNB receives the handover confirm message from the UE and then receives the UE NR security capabilities from the eMME during the TAU procedure, the MeNB starts the process of adding SgNB.

Combining with above embodiments of the present disclosure, the present disclosure provides several embodiments of apparatus as below.

Figure 9:
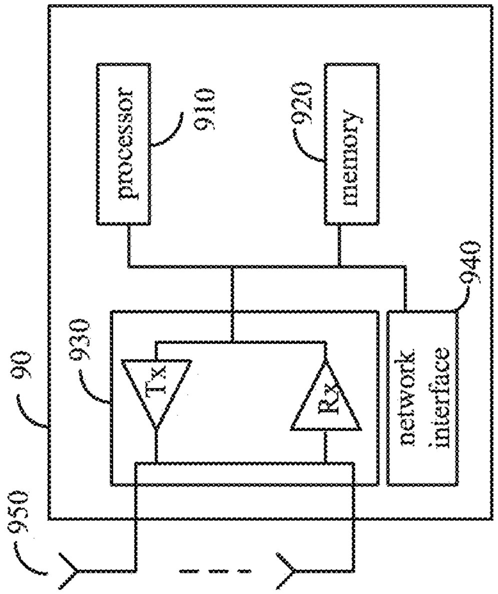
FIG. 9 illustrates a simplified block diagram of a base station in an embodiment of the present disclosure.

FIG. 9 is a block diagram of an embodiment of a base station 90 in the present disclosure. The base station 90 may be the MeNB 120, or legacy eNB 130 as described in above embodiments to implement corresponding methods. The base station 90 comprises at least one processor 910 and at least one memory 920, the base station 90 also comprises at least one transceiver 930, at least one network interface 940, and one or more antennas 950. The processor 910, the memory 920, the transceiver 930, and the network interface may be coupled together. The antenna 950 could be coupled to the transceiver 930. The network interface 940 is used to couple with other network apparatus. For example, the base station 90 could be connected to other base station and core network apparatus through the network interface 940.

The processor 910 may include at least any one kind of: central processing unit (CPU), digital signal processor (DSP), application-specific integrated circuit (ASIC), microcontroller unit (MCU), or field programmable gate array (FPGA). The processor 910 may include multiple processors or processing units inside. The multiple processors or processing units maybe integrated on one chip or distributed on different chips.

The memory 920 may be coupled to the processor 910. The memory 920 includes a non-transitory computer readable medium. The memory 920 may store computer program code to execute the methods provided in the embodiments of the present disclosure under the control of the processor 910. The executed computer program code also may be regarded as driving program of the processor 910. For example, the processor 910 is used for execute the computer program code stored in the memory 920 to realize the methods provided in the embodiments of the present disclosure.

The transceiver 930 may be any device to realize the receiving and sending of signal. The transceiver 930 may include a transmitter (TX) and a receiver (RX).

When the base station 90 is the legacy eNB 130 in above embodiments, it may realize corresponding steps in different methods.

Figure 10:
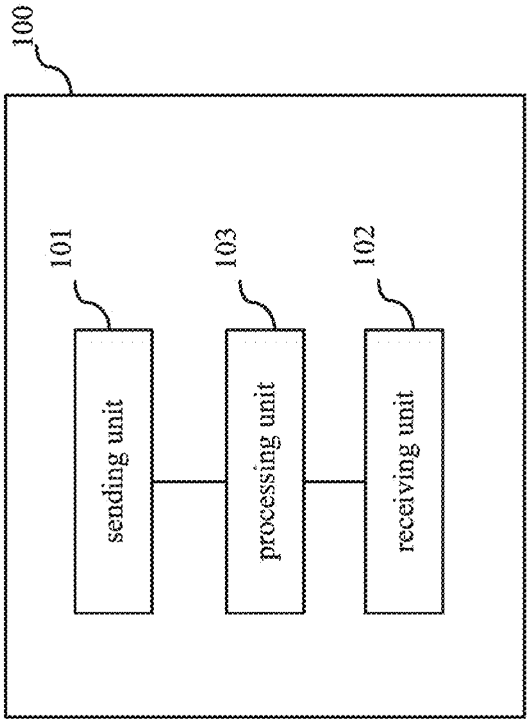
FIG. 10 illustrates a simplified block diagram of another base station in an embodiment of the present disclosure.

FIG. 10 is a diagram of another embodiment of a base station 100 in the present disclosure. The base station 100 includes a sending unit 101 and a receiving unit 102. The base station 100 may further include a processing unit 103. The base station 100 may be a legacy eNB 130 or a MeNB 120 in above embodiments of the present disclosure. The sending unit 101 is used to send a message to the UE 210 or to another base station or MME. The receiving unit 102 is used to receive a message to the UE 210, or to other base station or MME. The processing unit 103 is used to perform some steps in above embodiments, for example, steps related to the legacy eNB 130 or MeNB 120 to perform the initial attach, X2 handover, or S1 handover, or adding SgNB procedure, and so on.

Figure 11:
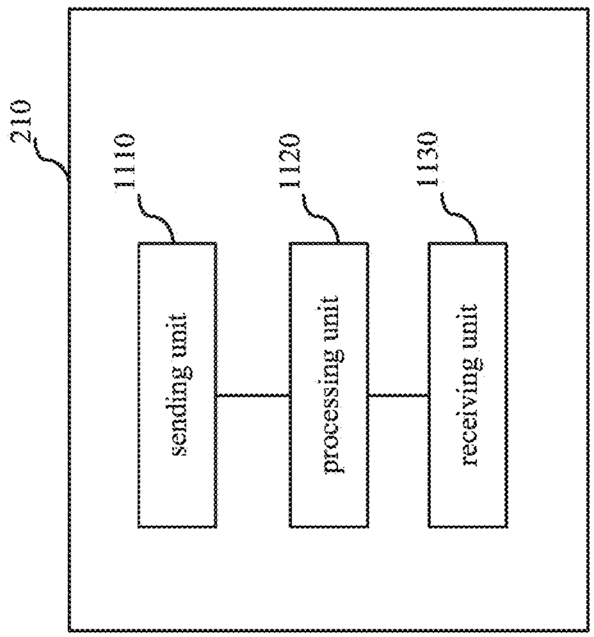
FIG. 11 illustrates a simplified block diagram of a UE in an embodiment of the present disclosure.

FIG. 11 is a diagram of an embodiment of the UE 210 in the present disclosure. The UE 210 may include a sending unit 1110 and a receiving unit 1120, the UE 210 may further includes a processing unit 1300. The sending unit 1100 may be used to send messages or information to a base station as referred in the above embodiments in the initial attach, X2 handover, or S1 handover, or adding SgNB procedure. The receiving unit 1200 may be used to receiving messages or information from a base station as referred in the above embodiments in the initial attach, X2 handover, or S1 handover, or adding SgNB procedure. The processing unit 300 is used to perform some steps in above embodiments, for example, steps related to the UE 210 to perform initial attach, X2 handover, or S1 handover, or adding SgNB procedure, and so on.

Figure 12:
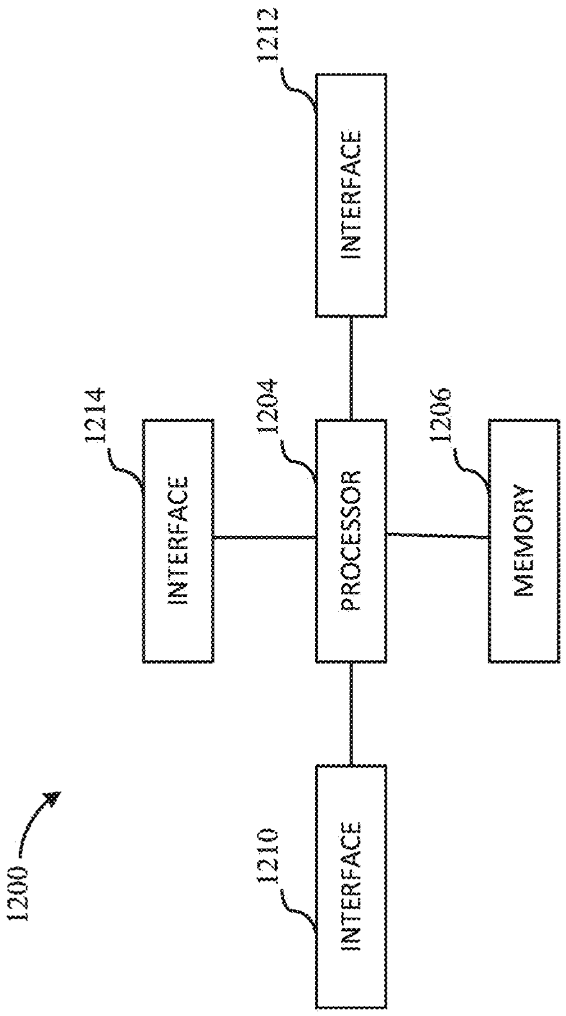
FIG. 12 illustrates a simplified block diagram of a processing system in an embodiment of the present disclosure.

FIG. 12 illustrates a block diagram of an embodiment processing system 600 for performing methods described herein, which may be installed in a host device. As shown, the processing system 1200 includes a processor 1204, a memory 1206, and interfaces 1210-1214, which may (or may not) be arranged as shown in the figure. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in the figure, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. For example, the legacy eNB 130, or MeNB, or the legacy MME 320, or the eMME 310 in the above embodiments of the present disclosure. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. For example, it could be the UE 210 in the above embodiments of the present disclosure.

In some embodiments, one or more of the interfaces 1210, 1212, 1214 connects the processing system 1200 to a transceiver adapted to transmit and receive signaling over the telecommunications network.

Figure 13:
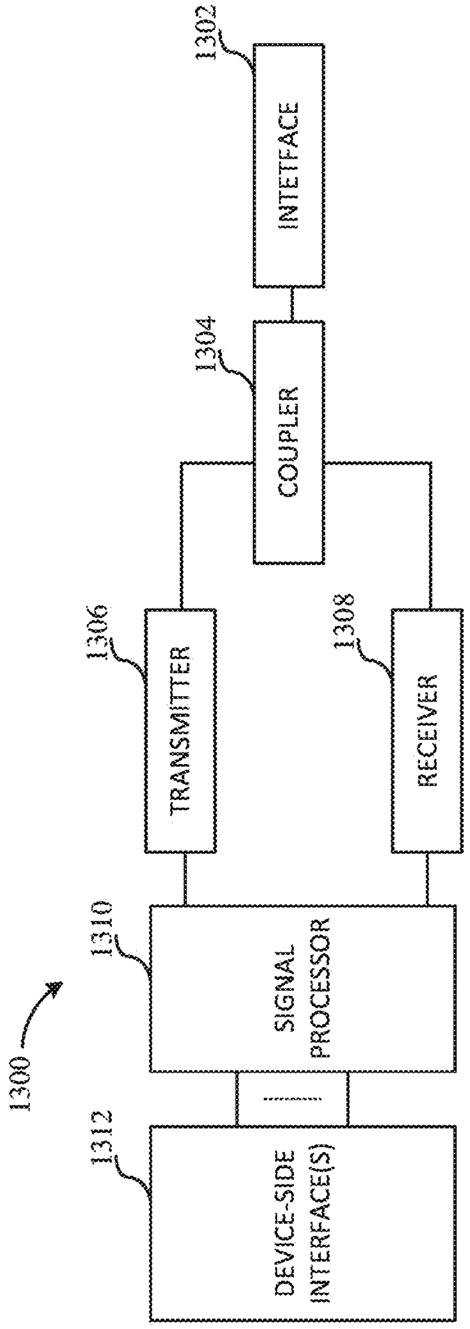
FIG. 13 illustrates a simplified block diagram of transceiver in an embodiment of the present disclosure.

FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Moreover, one embodiment of the present disclosure provides a computer storage medium for storing computer software comprising programs for executing methods of above embodiments.

One embodiment of the present disclosure provides a chipset system, the chipset system includes processor, used to implement the functionality of the UE 210, legacy eNB 130, MeNB 120, eMME 310, or legacy MME 320. The chipset system may further includes a memory for storing program instructions and data. The chipset system may be comprised by chipsets, and may also be comprised by at least one of chipsets and other Discrete device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by other units/modules. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method performed by a user equipment (UE) or a UE chipset system, comprising:

transmitting a tracking area update (TAU) request message to a mobility management entity (MME) during a TAU procedure, wherein the TAU request message comprises UE security capabilities that include first UE security capabilities and UE new radio (NR) security capabilities, and the first UE security capabilities include UE long term evolution (LTE) security capabilities;

receiving a non-access stratum (NAS) security mode command (SMC) message from the MME during the TAU procedure, wherein the NAS SMC message includes replayed UE security capabilities;

determining that the replayed UE security capabilities in the NAS SMC message do not include the UE NR security capabilities and include the first UE security capabilities; and continuing the TAU procedure when determining that the replayed UE security capabilities in the NAS SMC message do not include the UE NR security capabilities and include the first UE security capabilities.

2. The method of claim 1, wherein the TAU request message comprises a first information element for carrying the first UE security capabilities, and a second information element for carrying the UE NR security capabilities.

3. The method of claim 2, wherein the first UE security capabilities further comprise UE universal mobile telecommunications system (UMTS) security capabilities, and the first information element further comprises the UE UMTS security capabilities.

4. The method of claim 1, the method further comprising:

prior to transmitting the TAU request message, receiving an indication in a X2 or S1 handover, the indication indicating to send the UE NR security capabilities in the TAU procedure.

5. The method of claim 1, wherein the TAU request message is transmitted to a master evolved NodeB (MeNB) for forwarding to the MME, the MeNB serving the UE.

6. The method of claim 1, wherein the UE NR security capabilities include encryption and integrity protection algorithms that the UE or the UE chipset system supports over NR.

7. The method of claim 1, the method further comprising:

determining that no bidding attack has happened when determining that the replayed UE security capabilities in the NAS SMC message do not include the UE NR security capabilities and include the first UE security capabilities.

8. An apparatus, comprising:

a non-transitory memory storing program instructions; and at least one processor that executes the program instructions to cause the apparatus to:

transmit a tracking area update (TAU) request message to a mobility management entity (MME) during a TAU procedure, wherein the TAU request message comprises UE security capabilities that include first UE security capabilities and UE new radio (NR) security capabilities, and the first UE security capabilities include UE long term evolution (LTE) security capabilities;

receive a non-access stratum (NAS) security mode command (SMC) message from the MME during the TAU procedure, wherein the NAS SMC message includes replayed UE security capabilities;

determine that the replayed UE security capabilities in the NAS SMC message do not include the UE NR security capabilities and include the first UE security capabilities; and continuing the TAU procedure when determining that the replayed UE security capabilities in the NAS SMC message do not include the UE NR security capabilities and include the first UE security capabilities.

9. The apparatus of claim 8, wherein the TAU request message comprises a first information element for carrying the first UE security capabilities, and a second information element for carrying the UE NR security capabilities.

10. The apparatus of claim 8, wherein the first UE security capabilities further comprise UE universal mobile telecommunications system (UMTS) security capabilities, and the first information element further comprises the UE UMTS security capabilities.

11. The apparatus of claim 8, wherein the at least one processor further executes the program instructions to cause the apparatus to:

prior to transmitting the TAU request message, receive an indication in a X2 or S1 handover, the indication indicating to send the UE NR security capabilities in the TAU procedure.

12. The apparatus of claim 8, wherein the TAU request message is transmitted to a master evolved NodeB (MeNB) for forwarding to the MME.

13. The apparatus of claim 8, wherein the UE NR security capabilities include encryption and integrity protection algorithms that the apparatus supports over NR.

14. The apparatus of claim 8, wherein the apparatus is a UE or a UE chipset system.

15. The apparatus of claim 8, wherein the at least one processor further executes the program instructions to cause the apparatus to:

determine that no bidding attack has happened when determining that the replayed UE security capabilities in the NAS SMC message do not include the UE NR security capabilities and include the first UE security capabilities.

16. A non-transitory computer-readable storage medium, comprising program instructions that, when executed by an apparatus, cause the apparatus to perform:

transmitting tracking area update (TAU) request message to a mobility management entity (MME) during a TAU procedure, wherein the TAU request message comprises UE security capabilities that include first UE security capabilities and UE new radio (NR) security capabilities, and the first UE security capabilities include UE long term evolution (LTE) security capabilities;

receiving a non-access stratum (NAS) security mode command (SMC) message from the MME during the TAU procedure, wherein the NAS SMC message includes replayed UE security capabilities;

determining that the replayed UE security capabilities in the NAS SMC message do not include the UE NR security capabilities and include the first UE security capabilities; and continuing the TAU procedure when determining that the replayed UE security capabilities in the NAS SMC message do not include the UE NR security capabilities and include the first UE security capabilities.

17. The non-transitory computer-readable storage medium of claim 16, wherein the TAU request message comprises a first information element for carrying the first UE security capabilities and a second information element for carrying the UE NR security capabilities.

18. The non-transitory computer-readable storage medium of claim 17, wherein the first UE security capabilities further comprise UE universal mobile telecommunications system (UMTS) security capabilities, and the first information element further comprises the UE UMTS security capabilities.

19. The non-transitory computer-readable storage medium of claim 16, wherein the UE NR security capabilities include encryption and integrity protection algorithms that the apparatus supports over NR.

20. The non-transitory computer-readable storage medium of claim 16, wherein the program instructions, when executed by the apparatus, further cause the apparatus to perform:

determining that no bidding attack has happened when determining that the replayed UE security capabilities in the NAS SMC message do not include the UE NR security capabilities and include the first UE security capabilities.

* * * * *